United States Patent
Tsukamoto

(10) Patent No.: US 7,735,886 B2
(45) Date of Patent: Jun. 15, 2010

(54) TOOL FOR PICKING AND CARRYING DOG DUNG

(76) Inventor: Tatusabu Tsukamoto, 2570, Ohaza Mukaizima, Chiyodacho, Kanzaki-gun, Saga, 842-0063 (JP)

( * ) Notice: Subject to any disclaimer, the term of this patent is extended or adjusted under 35 U.S.C. 154(b) by 619 days.

(21) Appl. No.: 10/582,943

(22) PCT Filed: Dec. 8, 2004

(86) PCT No.: PCT/JP2004/018687

§ 371 (c)(1),
(2), (4) Date: Mar. 1, 2007

(87) PCT Pub. No.: WO2005/058027

PCT Pub. Date: Jun. 30, 2005

(65) Prior Publication Data

US 2008/0012366 A1 Jan. 17, 2008

(30) Foreign Application Priority Data

Dec. 16, 2003 (JP) ............................ 2003-418794
Nov. 15, 2004 (JP) ............................ 2004-331286

(51) Int. Cl.
*A01K 29/00* (2006.01)
*E01H 1/12* (2006.01)
(52) U.S. Cl. ................................................. 294/1.5
(58) Field of Classification Search ............... 294/1.4, 294/1.5, 19.1, 55; 119/161; 15/257.1, 247.6, 15/257.6
See application file for complete search history.

(56) References Cited

U.S. PATENT DOCUMENTS 4,042,269 A * 8/1977 Skermetta ............... 294/1.5
4,248,468 A * 2/1981 Hastings ................. 294/1.4
4,368,907 A * 1/1983 Ross ...................... 294/1.4
5,601,321 A * 2/1997 Simon .................... 294/1.4
5,628,537 A * 5/1997 Kiemer ................... 294/1.4
6,164,710 A * 12/2000 Shibuya .................. 294/1.5

FOREIGN PATENT DOCUMENTS

JP 3015127 U 6/1995
JP 10-56908 A 3/1998

OTHER PUBLICATIONS

International Search Report of PCT/JP2004/018687, date of mailing Apr. 19, 2005.

* cited by examiner

*Primary Examiner*—Dean J Kramer
(74) *Attorney, Agent, or Firm*—Westerman, Hattori, Daniels & Adrian, LLP

(57) ABSTRACT

A tool for picking up and carrying dog dung excellent in appearance and capable of being easily carried in dog walk. The tool being is operable on hand in catching, carrying, and discharging the dog dung. At least one swinging support is provided at an end of a long shaft extending from a grip of a shank. A receiver and a lid swinging in directions opposing each other are provided with openings and peripherals supported by the swinging support. Bosses formed on parts of outer walls of the receiver and the lid are connected to operating rod vertically movable along the shaft via link. By an operation unit of the operating rod arranged adjacent to the grip, the receiver is upturned about at the right angle to the shaft when the lid is shut. The receiver and the lid are largely opened forwardly during discharge of the dung. At an intermediate opening position, the receiver is inclined in a direction suitable for catching the dung by the receiver.

22 Claims, 15 Drawing Sheets

FIG. 1
FIG. 2
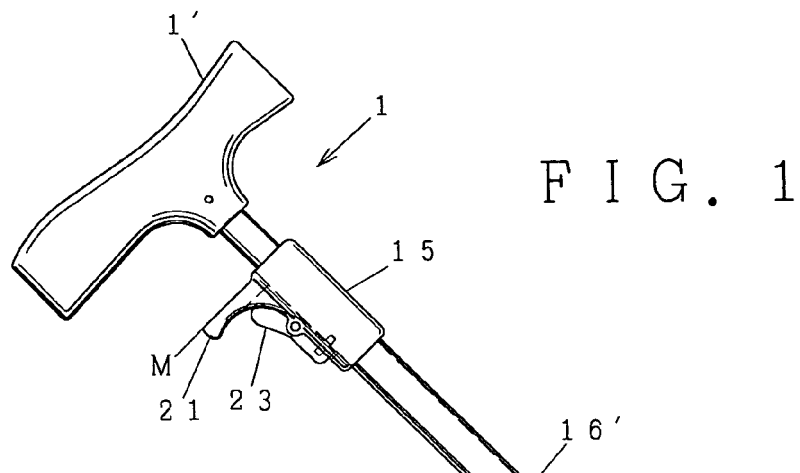
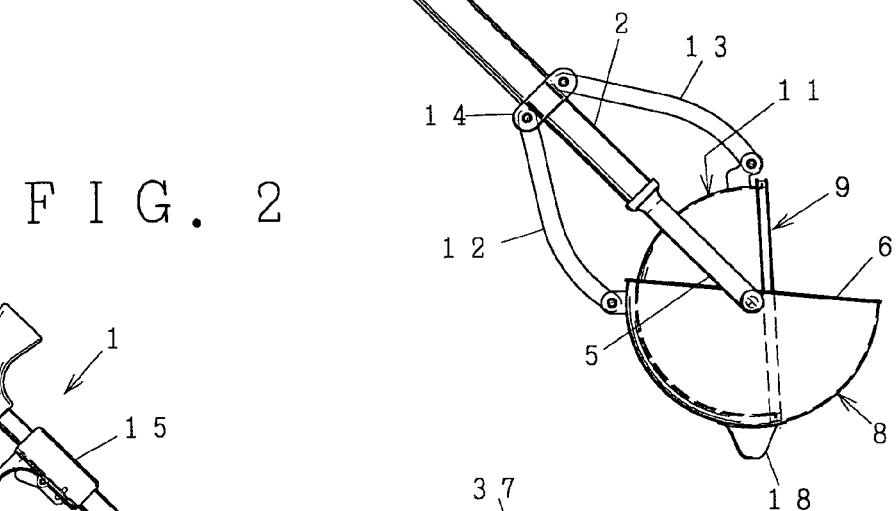
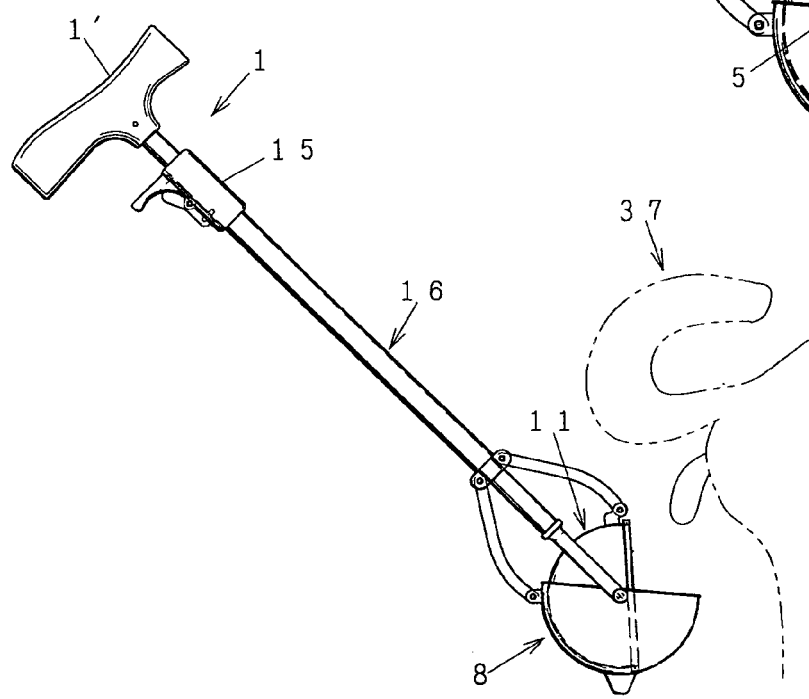

FIG. 14
FIG. 15
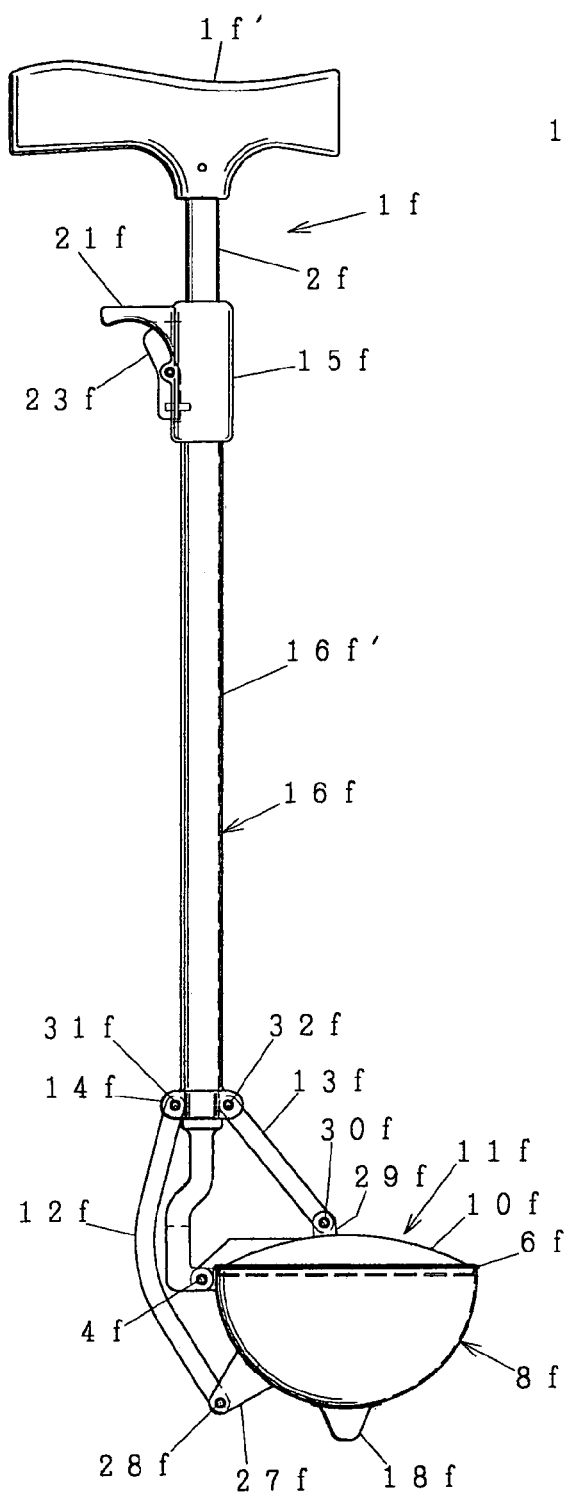
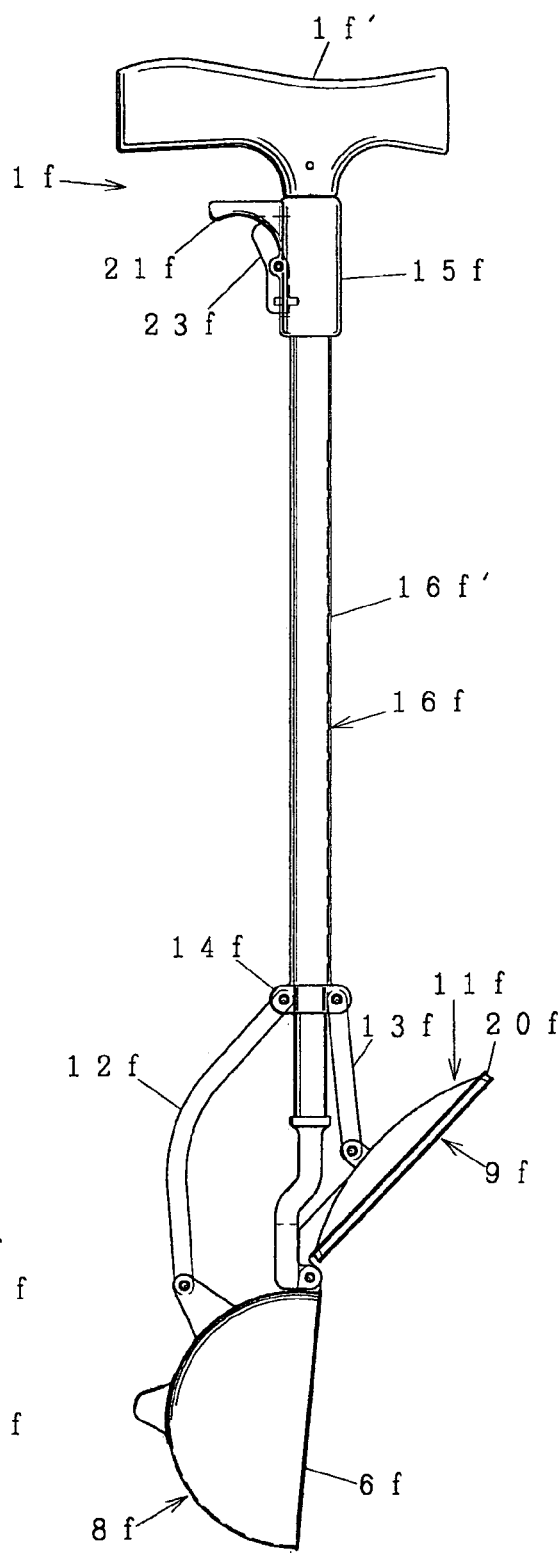

FIG. 17
FIG. 18
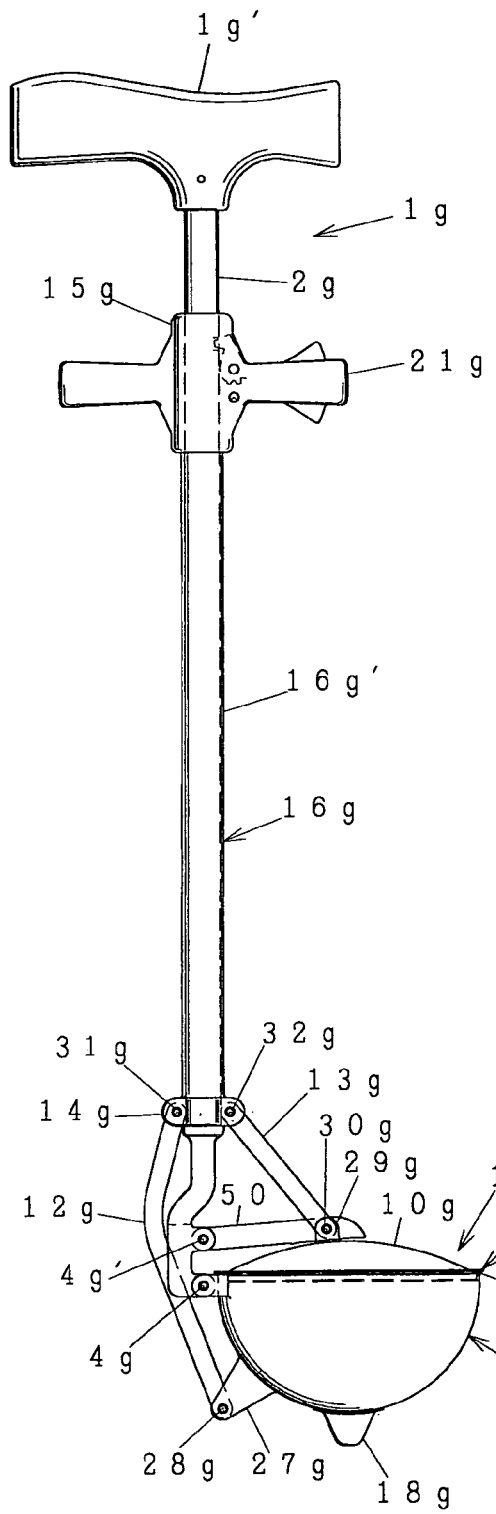
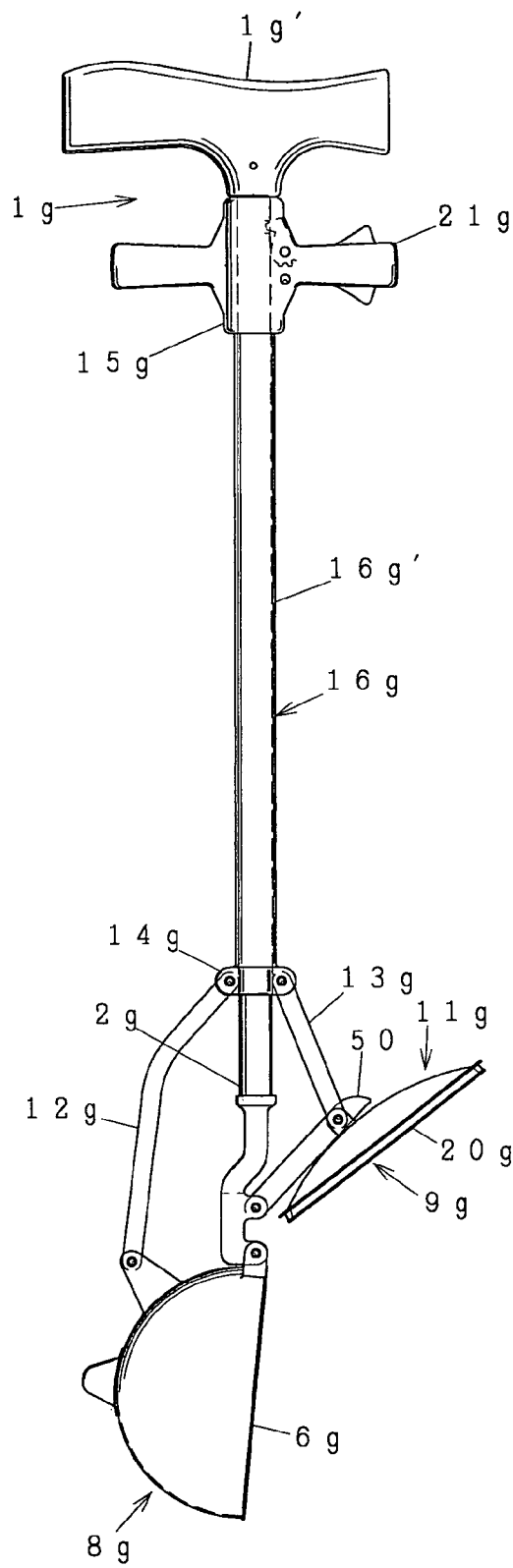

TOOL FOR PICKING AND CARRYING DOG DUNG

TECHNICAL FIELD

The present invention relates to a tool for picking up and carrying dog dung so as to discharge it at a predetermined place by carrying the tool during walking around for dogs.

BACKGROUND ART

Tools for catching and bringing back dog dung have been available. In most, they are mainly composed of a tool for scooping or pinching dog dung on the ground and a bag for containing the dung. A portable pet dung collector disclosed in Japanese Registered Utility Model No. 3051160 includes a retaining ring supported to a hinge at the tip of a collapsible shaft for attaching a plastic film bag thereto. Such tools have disadvantages that the retaining ring must be touched by a hand and is inconvenient to carry it so as to give people repulsed feeling. In a sanitary device for removing animal droppings disclosed in U.S. Pat. No. 4,042,269 and a portable canine commode in U.S. Pat. No. 4,555,132, a cup receiver is fixed to the end of a shank extending from a grip with an inclination suitable for catching the dung and above the receiver, a lid is supported by a hinge, which can be operated to open or close the lid from the grip. A flaw of such a tool is that since the receiver is fixed in an inclination suitable for catching the dung, the dung is difficult to be discharged. As a result, the bottom of the receiver must also be openable, complicating the tool. Also, when going out while carrying the tool in one's hand in a vertical direction after catching the dung, the opening of the receiver may be inclined, so that great care was required in designing the lid in structure and also in using the tool. Furthermore, it is difficult to remove and clean the dung adhered on the inside of the small receiver.

Tools for picking up and carrying dog dung available up to now have disadvantages that they are generally difficult to use and are awkward looking when they are carried, such disadvantages have been driving away the potential users.

It is an object of the present invention to provide a tool for picking up and carrying dog dung which is excellent in picking up, housing, and discharging the dog dung as well as having good appearance when carrying it for dog walk.

It is another object of the present invention to provide a tool for picking up and carrying dog dung in which a receiver can be opened in a direction easily picking up the dung by a simple operation of an operation unit so as to hold the receiver in a direction easily carrying the dung by closing a lid after picking up the dung as well as the receiver can be largely opened in a direction easily discharging the dung on a toilet by a simple operation while carrying the tool in one's hand.

It is still another object of the present invention to provide a tool for picking up and carrying dog dung capable of pushing out and discharging the dung within a receiver by a simple operation while carrying the tool in one's hand.

It is another object of the present invention to provide a tool for picking up and carrying dog dung to which the dung is difficult to adhere and remain on insides of a receiver and a lid.

It is another object of the present invention to provide a tool for picking up and carrying dog dung in which rain-water is difficult to infiltrate a receiver as well as odor of the dog dung cannot leak out.

It is another object of the present invention to provide a tool for picking up and carrying dog dung in which the inside and the outside of a receiver can be easily cleaned by washing them with water so as to maintain the tool clean and glossy, and the tool is compact with a large holding capacity.

It is another object of the present invention to provide a tool for picking up and carrying dog dung which is easily carried during dog walking and has a grip and an operation unit which are easily operated in picking up and discharging the dung.

DISCLOSURE OF INVENTION

The present invention provides a tool for picking up and carrying dog dung including a shank having a shaft longitudinally linearly extending from a grip and at least one swinging support attached to the end of the shaft so as to have a swinging axial line in a direction intersecting with the shaft; a receiver having an opening, which opens substantially in parallel with the swinging axial line, and a concave inner wall, the receiver being supported swingably about the swinging axial line by fitting at least one support disposed in the vicinity of the opening to the swinging support; a lid having fringing means disposed substantially in parallel with the swinging axial line for closely covering the opening and a cover for covering the inside of the fringing means, the lid being supported swingably in a direction opposing the receiver by fitting at least one support disposed in the vicinity of its peripheral edge to the swinging support; a rear link with its lower end rotatably connected to a boss provided at part of an outer wall of the receiver; a front link with its lower end rotatably connected back and forth to a boss provided at part of an outer wall of the lid; and operating rod means having a link holder retained to the shaft movably in the vertical direction for holding the rear link and the front link by rotatably connecting the upper ends of the links to the link holder.

Then, when the operating rod means moves to one position so as to be held at the position, the receiver is turned upward about at the right angle to the shaft and the lid is shut thereon facedown, so that the fringing means plugs the opening of the receiver. When the operating rod means moves to the other position so as to be held at the position, the receiver and the lid are largely opened by inclining in one direction of the shaft. When the operating rod means is held at an intermediate position of the above-movement, the opening of the receiver is opened at an inclination suitable for catching the dung.

Also, a tool for picking up and carrying dog dung according to the present invention includes a shank having a shaft longitudinally linearly extending from a grip and a fork attached to the end of the shaft so as to linearly extend, forked ends of the fork laterally separating from each other, and to have swinging supports respectively attached to the forked ends along a swinging axial line in a direction intersecting the end portion of the shaft; a receiver having an opening, which opens substantially in parallel with the swinging axial line, and an inner wall deeply concave from the opening, the receiver being supported swingably about the swinging axial line by fitting supports disposed on both sides of the opening to the swinging supports inside the fork, respectively; a lid having fringing means disposed substantially in parallel with the swinging axial line for closely covering the inside of the opening and a cover for covering the inside of the fringing means, the lid being supported swingably in a direction opposing the receiver by fitting supports disposed on both sides of its peripheral to the both swinging supports, respectively, in the inside of the receiver; a rear link with its lower end rotatably connected to a boss provided at part of an outer wall of the receiver; a front link with its lower end rotatably connected to a boss provided at part of an outer wall of the lid; and operating rod means having a link holder retained to the shaft movably in the vertical direction for holding the rear link and the front link by rotatably connecting the upper ends of the links to the link holder.

Then, when the operating rod means moves to one position so as to be held at the position, the receiver is turned upward about at the right angle to the shaft and the lid is shut thereon facedown, so that the fringing means plugs the opening of the receiver. When the operating rod means moves to the other position so as to be held at the position, the receiver and the lid are overlapped with each other and opened by inclining in one direction of the shaft. When the operating rod means is held at an intermediate position of the above-movement, the opening of the receiver is opened at an inclination suitable for catching the dung.

In the receiver and the lid, for the below-mentioned reason, preferably, the receiver includes an inner wall concave in a shape of a semi-revolution solid rotated about the swinging axial line and an opening, which flatly opens substantially in parallel with the swinging axial line, the receiver being supported swingably about the swinging axial line by fitting supports disposed on the both sides of the opening to both the swinging supports of the fork; and the lid includes the fringing means for closely covering the inside of the opening and a cover for covering the inside of the fringing means, the lid being supported swingably about the swinging axial line in a direction opposing the receiver by fitting the supports disposed on both sides of the fringing means to the both swinging supports in the inside of the receiver, respectively.

Further preferably, the lid includes fringing means for closely covering the inside of the opening of the receiver and a cover for covering the inside of the fringing means by approaching the inner wall of the receiver so as to protrude in a shape of a semi-revolution solid rotated about the swinging axial line, the lid being supported swingably about the swinging axial line in a direction opposing the receiver by fitting the supports disposed on both sides of the fringing means to the both swinging supports in the inside of the receiver, respectively.

In particular, more preferably, the receiver includes an inner wall concave in a hemispherical shape rotated about the swinging axial line and an opening, which flatly opens substantially in parallel with the swinging axial line, the receiver being supported swingably about the swinging axial line by fitting supports disposed on the both sides of the opening to both the swinging supports, respectively, inside the fork; and the lid includes fringing means for closely covering the inside of the opening and a cover for covering the inside of the fringing means by approaching the inner wall of the receiver so as to protrude in a hemispherical shape, the lid being supported swingably about the swinging axial line in a direction opposing the receiver by fitting the supports disposed on both sides of the fringing means to the both swinging supports in the inside of the receiver, respectively; so that the entire of the receiver and the lid has a substantially spherical shape when the lid is held in a closed position.

As for the receiver and the lid, a tool for picking up and carrying dog dung also includes a receiver having an opening, which opens substantially in parallel with the swinging axial line, and an inner wall deeply concave from the opening, the receiver being supported swingably about the swinging axial line by fitting supports disposed on both sides of the opening to the swinging supports inside the fork, respectively; and a lid having fringing means disposed substantially in parallel with the swinging axial line for closely covering the outside of the opening and a cover for covering the inside of the fringing means, the lid being supported swingably in a direction opposing the receiver by fitting supports disposed on both sides of its peripheral to the both swinging supports, respectively, in the outside of the receiver. Then, in the same way as described above, the opening and shutting operation of the receiver and the lid can be performed by the operating rod means via the rear link and the front link.

The revolution solid in this specification defines a three dimensional figure obtained by rotating a certain plane figure about one rotational axis, so that the shape viewed along the rotational axis is a circle. That is, a sphere is a revolution solid obtained by rotating a circle about its center line, and a semi-revolution solid is a solid obtained by cutting a revolution solid along the rotational axis into two.

According to the present invention, preferably, the shank includes a shaft longitudinally linearly extending from a grip and one swinging support attached to the end of the shaft so as to have a swinging axial line in a direction intersecting with the shaft; the receiver includes an opening, which opens substantially in parallel with the swinging axial line, and a concave inner wall, the receiver being supported swingably about the swinging axial line by fitting one support disposed in the rear side in the vicinity of the opening to the swinging support; and the lid includes fringing means disposed substantially in parallel with the swinging axial line for closely covering the opening and a cover for covering the inside of the fringing means, the lid being supported swingably in a direction opposing the receiver by fitting one support disposed in the rear side in the vicinity of its peripheral edge to the swinging support. Then, in the same way as described above, the tool for picking up and carrying dog dung can be obtained in which the opening and shutting operation of the receiver and the lid can be performed by the operating rod means via the rear link and the front link.

Further preferably, the shank includes a shaft longitudinally linearly extending from a grip, a swinging support of the receiver attached to the end of the shaft so as to have a swinging axial line in a direction intersecting with the shaft, and a swinging support of the lid disposed in parallel with the swinging support of the receiver; the receiver includes an opening, which opens substantially in parallel with the swinging axial line, and a concave inner wall, the receiver being supported swingably about the swinging axial line by fitting one support disposed in the rear side in the vicinity of the opening to the swinging support of the receiver; and the lid includes fringing means disposed substantially in parallel with the swinging axial line for closely covering the opening and a cover for covering the inside of the fringing means, the lid being supported swingably in a direction opposing the receiver by fitting one support disposed in the rear side in the vicinity of its peripheral edge to the swinging support of the lid. Thus, in the same way as described above, the opening and shutting operation of the receiver and the lid can be performed by the operating rod means via the rear link and the front link.

According to the present invention, preferably, the operating rod means includes an operating unit slidably fitted to the shaft of the shank, the operating unit including an operation lever protruding in at least one direction intersecting the shaft and a stop lever bent rearward and supported to the lower inside of the operation lever by swinging holding means crosswise swingably towards and away from the shaft like a seesaw, and the stop lever having a stop pin arranged at the lower end of the stop lever for coming in and out of the shaft, and the shaft includes stop hole means provided at a stopping position of the stop pin on the shaft of the shank.

Also, preferably, the operating rod means includes an operating unit including an operation lever protruding in at least one direction intersecting the shaft; an upper stop lever having a lever portion retained in the operation lever swingably in up and down directions with upper swinging holding means and upward exposed at least partly from the operation lever, a stop projection coming in and out of the shaft by swinging in front and rear directions toward the shaft from a root side, and an upper connection gear arranged in the lower side of the upper swinging holding means; a lower stop lever having a lever portion retained in the operation lever with lower swinging holding means symmetrically with the upper stop lever and downward exposed at least partly from the operation lever, and a lower connection gear arranged in the upper side of the lower swinging holding means so as to mesh with the upper connection gear, the lower stop lever swinging in direction opposing the upper stop lever; an opening spring arranged between the lever portions of both the upper and lower stop levers; and stop hole means provided in stopping portions of the shaft to be stopped by the stop projection.

In the upper stop lever and the lower stop lever of the operating unit, the stop projection positioned at upper stop lever can be replaced by two stop claws which swing back and forth in the direction of the shaft and positioned on the side of root of the levers and which also stop the movement by pressing the claws to the shaft by a spring which gives opening force.

The operating rod means integrally includes a rod portion, a link holding portion provided below the rod portion, and the operation unit provided above the rod portion, and these elements may be arbitrarily modified. The present invention is enabled to work irrelevant to the modifications of the elements.

In the tool for picking up and carrying dog dung according to the present invention, it is especially preferable that the T-shaped grip be provided at the upper end of the shank so as to intersect the shaft in back and forth directions.

Also, the lid may be arranged in any of the outside and the inside of the receiver; however, the inside is rather advantageous in view of air-tightness and discharge of the dung.

The tool according to the present invention is suitable for catching the dung within the receiver by moving the opening on the receiver closer under the afterpart of a dog during just defecation while a user standing or somewhat bowing, rather than picking up the dung on the ground.

Hence, the length of the shaft may preferably be long enough and the opening in the front of the tool is applied under the afterpart of a dog by confirming it with eyes. The angle of the shaft at this time may be about 10° to 70° to the perpendicular of the flat ground.

Obviously, the tool for picking up and carrying dog dung can also pinch and rake the dung on the ground up by opening the receiver with the operation unit.

Other inventions will be apparent in the following best mode for carrying out the invention.

BRIEF DESCRIPTION OF THE DRAWINGS

FIG. 1 is a side view of a tool for picking up and carrying dog dung according to an embodiment, in which a shaft is inclined at an angle of 45° rearward;

FIG. 2 is a side view of the embodiment shown in FIG. 1 showing a catching dung state;

FIG. 14 is a side view of a tool for picking up and carrying dog dung according to another embodiment with the vertically directed shaft;

FIG. 15 is a drawing of the embodiment shown in FIG. 14 showing the largely opened receiver and lid;

FIG. 17 is a side view of a tool for picking up and carrying dog dung according to another embodiment with the vertically directed shaft;

FIG. 18 is a side view of the embodiment shown in FIG. 17 showing the largely opened receiver and lid with the vertically directed shaft.

BEST MODE FOR CARRYING OUT THE INVENTION

Figure 3:
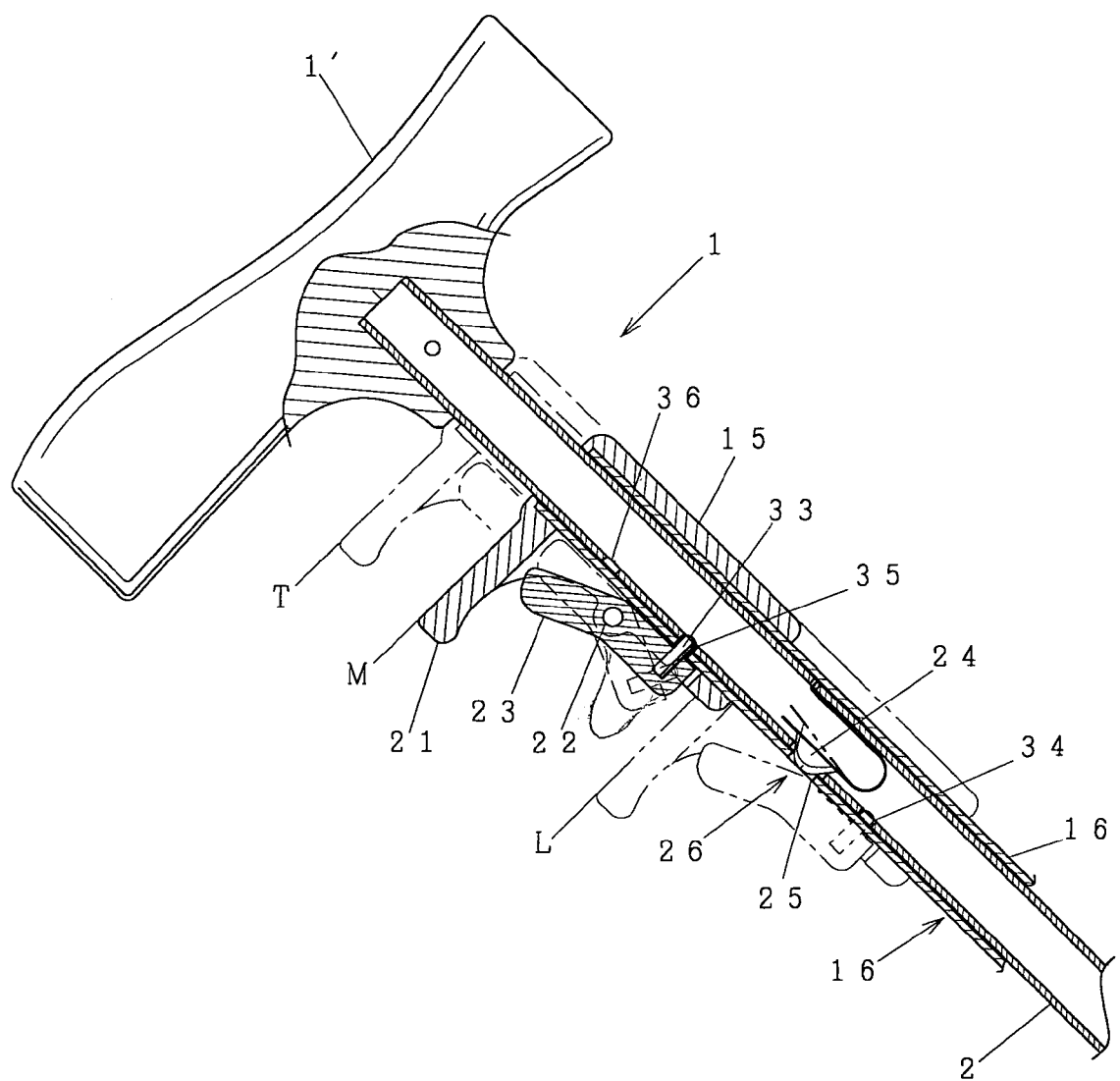
FIG. 3 is an enlarged partial sectional view of the vicinity of an operation unit in the embodiment shown in FIG. 1 showing positions of an operation lever at an opened position and a closed position of a receiver with phantom lines.
Figure 4:
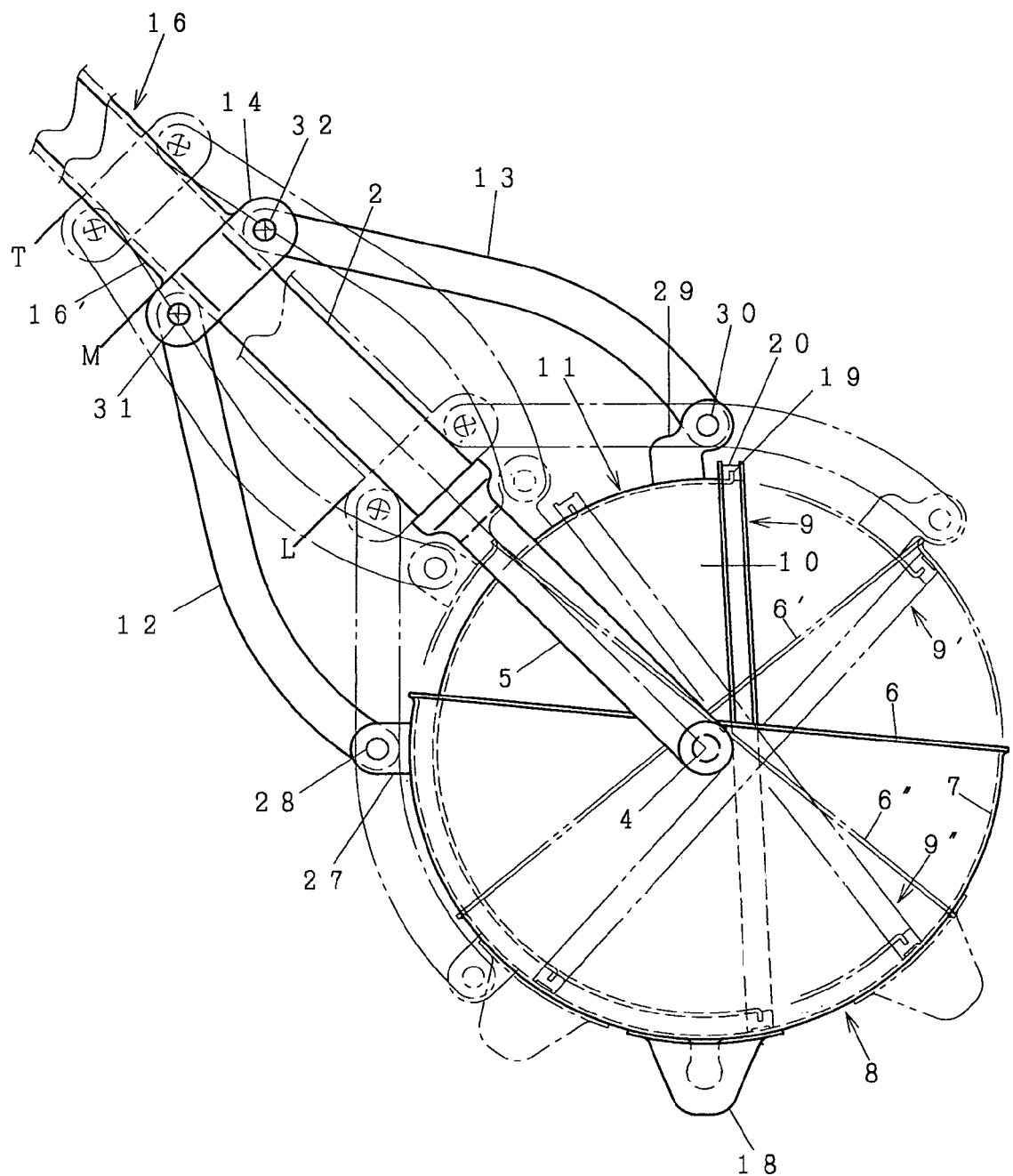
FIG. 4 is an enlarged partial sectional view of the vicinity of the receiver in the embodiment shown in FIG. 1 showing states of elements at the opened position and the closed position of the receiver with phantom lines.

Embodiments of the present invention will be described with reference to the drawings.

Referring to FIGS. 1 to 7, a shank 1 includes a long shaft 2 extending from a grip 1' at the upper end of the shank 1 in a T-shape and a fork 5 arranged at the end of the shaft 2 and having two arms extending longitudinally while being sideward spaced from each other. At ends of the two arms, swinging supports 4 and 4' are provided, each having an inward extending pin. The straight line connecting the swinging supports 4 and 4' is a swinging axial line 3 being perpendicular to the shaft 2. Inside the fork 5, a receiver 8 is attached. The receiver 8 includes an opening 6 opening flatly and a concave inner wall 7, and is swingably supported around the swinging axial line 3 by fitting holding parts formed on both sides of the opening 6 into the swinging supports 4 and 4', respectively. Inside the receiver 8, a lid 11 is attached. The lid 11 includes flat fringing means 9 for closely covering the opening 6 and a cover portion 10 covering the inside the fringing means 9, and is supported swingably in an opposing direction to the receiver 8 by fitting holding parts formed on both sides of a periphery of the lid 11 into the swinging supports 4 and 4' in the internal side of the receiver 8, respectively. At the rear edge of the receiver 8, a boss 27 is formed for a connection pin, and the lower end of a rear link 12 is crosswise rotatably connected to the boss 27 via a pin 28.

On the other hand, at the front edge of the lid 11, a boss 29 is formed for a connection pin, and the lower end of a front link 13 is crosswise rotatably connected to the boss 29 via a pin 30. The shaft 2 is provided with a rod 16' of operating rod means 16 made of a pipe and fitted vertically slidably thereto. At the lower end of the rod 16', a link holder 14 is provided, which crosswise rotatably connect the upper ends of the rear link 12 and the front link 13 together with a rear link pin 31 and a front link pin 32. On the other hand, at the upper end of the rod 16', an operation unit 15 is provided, which includes an operation lever 21 protruding in a direction intersecting the shank. Lower inside the operation lever 21, a stop lever 23 is provided, which is supported on a lower portion of the operation lever 21 crosswise swingably towards and away from the shank like a seesaw. The stop lever 23 includes a stop pin 33 arranged at the lower end of the stop lever 23 and protruding forwardly. On the other hand, the shaft 2 is provided with a stop hole 34, a stop hole 35, and a stop hole 36 formed on the outer periphery, where the operation unit 15 passes through, from the lower in that order. As shown in the phantom line of FIG. 3, when the upper portion of the stop lever 23 is pushed, the stop pin 33 comes off the stop hole, and when the lower portion of the stop lever 23 is pushed, the stop pin 33 is fitted into the stop hole.

Figure 5:
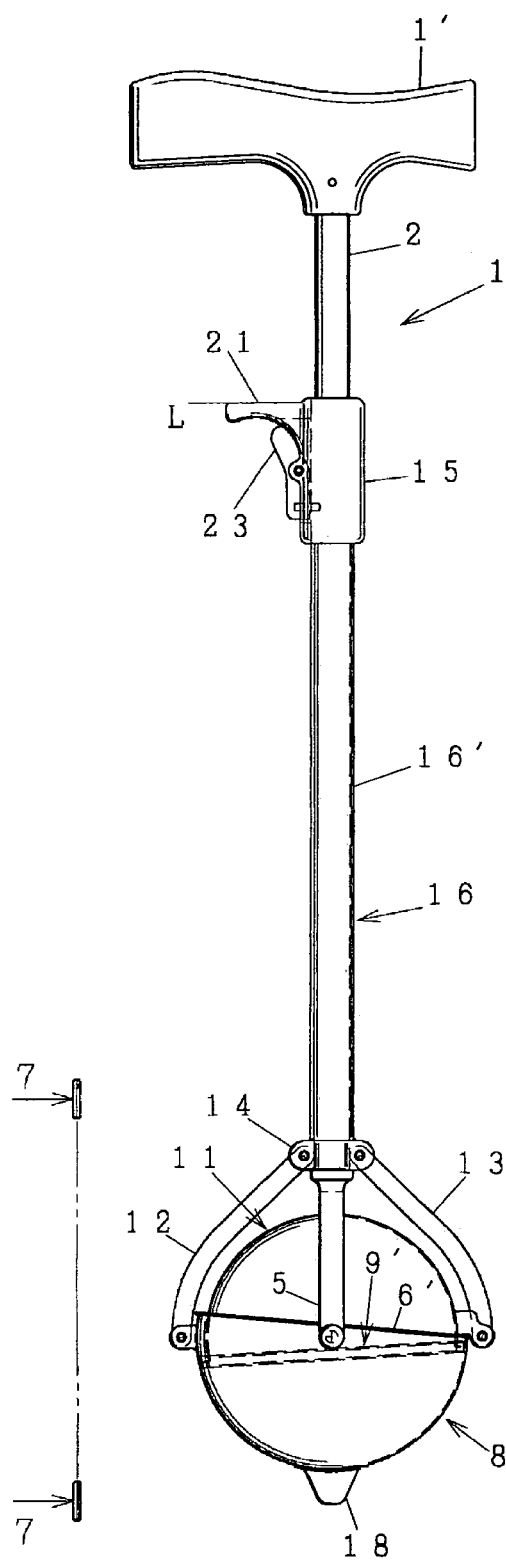
FIG. 5 is a side view of the embodiment shown in FIG. 1 showing a state in that a lid is shut with the vertically directed shaft.

Then, with a finger of a hand gripping the grip 1', the operation lever 21 can be operated so as to vertically move the operation unit 15 from a position L to a position T. In FIGS. 1 to 4, the shaft 2 is depicted in a state that it is inclined by 45° rearward from the vertical direction and the operation lever 21 is located at the position M. At the position shown in the drawings, the receiver 8 and the lid 11 are inclined frontward so that the front side of the opening 6 is opened in a suitable direction for catching defecation. In FIG. 2, a state during the catching defecation is depicted. The dung is caught within the receiver by moving the opening 6 of the receiver closer under the afterpart of a dog 37 while a user standing or somewhat bowing. After catching the dung, the operation lever 21 is moved to the position L. When the operation lever 21 is held at this position, the receiver 8 is upward directed substantially perpendicularly to the shaft 2 so that the opening 6 is located at a position designated by symbol 6'. On the other hand, the lid 11 is downward shut inside the receiver 8 so that the fringing means 9 blocks off the opening at a position designated by symbol 9'. FIG. 5 shows a state that the shaft 2 is vertically directed and the lid is shut. The stop lever 23 is pushed so that the stop pin 33 is fitted into the stop hole 34, and the operating rod means 16 is stopped moving so that the receiver 8 and the lid 11 are held not to move.

Generally, the tool is carried in this state that the shaft 2 is vertically directed. Since the receiver 8 is in a substantially vertical state and the lid 11 is secured shut, the dung does not spill out.

Figure 6:
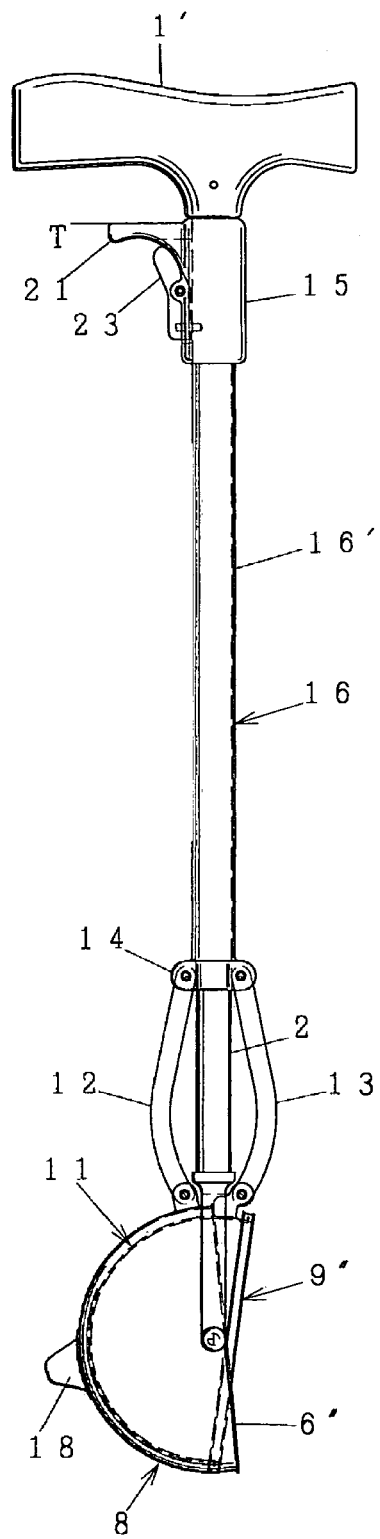
FIG. 6 is a side view of the embodiment shown in FIG. 1 showing a state in that the lid is largely opened with the vertically directed shaft.
Figure 7:
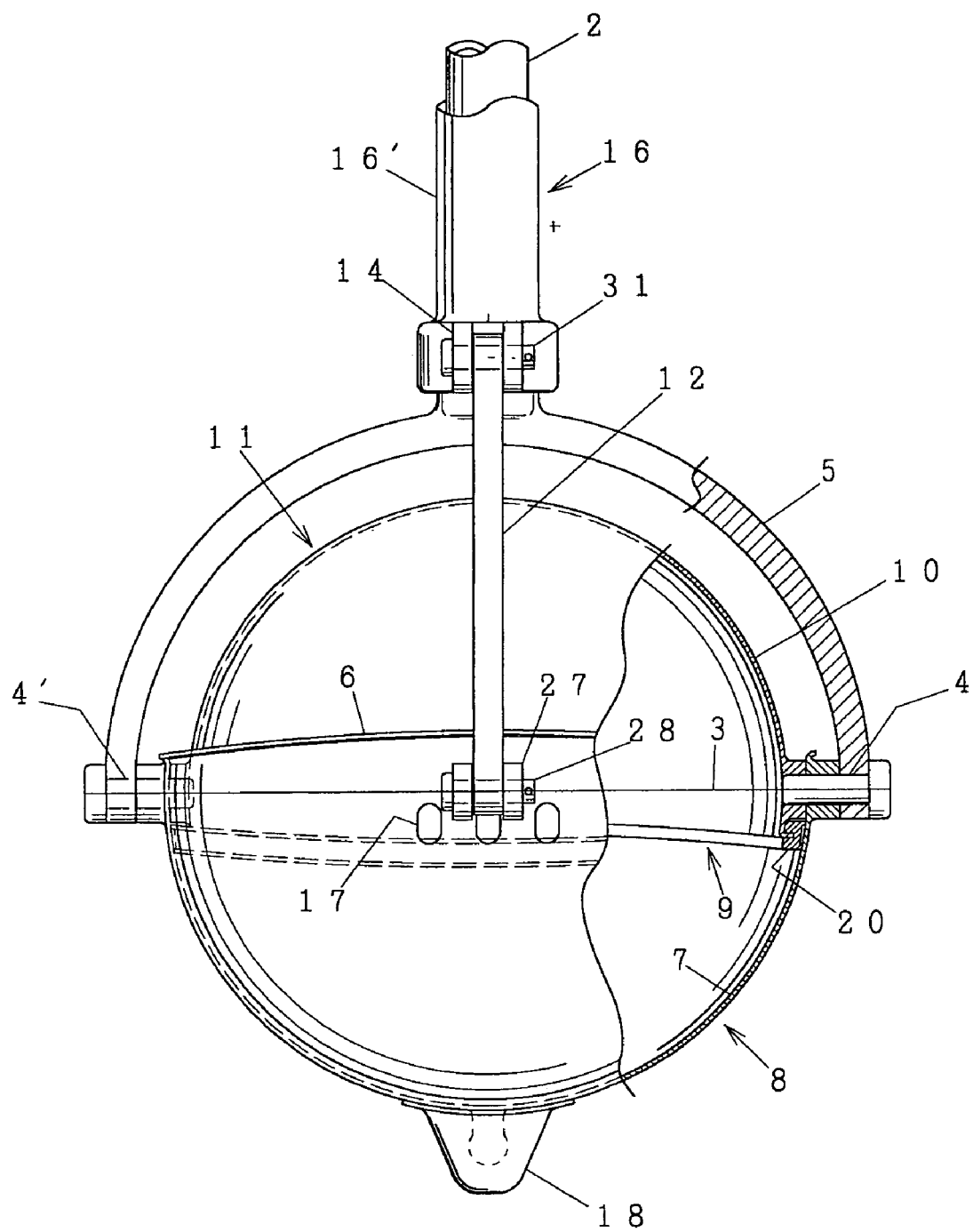
FIG. 7 is a partial sectional view at the line 7-7 of FIG. 5.

The discharge of the dung may also be performed in a vertical state of the receiver 8 as shown in FIG. 6. The stop pin 33 is put off the stop hole 34 by operating the stop lever 23, and the operation lever 21 is moved to the position T by pulling it. When the operation lever 21 is held at this position, the receiver 8 and the lid 11 are located at the rear of the shaft 2; the opening 6 is moved to a position 6"; and the fringing means 9 to a position 9" so that the receiver 8 is largely opened. During this movement, the rear of the fringing means 9 moves along an inner wall 7 so that things adhered to the dung are also pushed forward together. Then, the lid 11 is forward opened by overlapping with the inside of the receiver 8. The inside of the receiver 8 is maintained clean, and the inside of the opened lid 11 may be cleaned with water. At this time, the stop pin 33 is also fitted into the upper stop hole 36 by pushing the stop lever 23 so as to maintain the receiver 8 and the lid 11 immovable. The important thing herein is that the receiver 8 and the lid 11 are largely swung from the substantially perpendicular posture to the parallel posture to the shaft 2.

According to the embodiment, the respective receiver 8 and the lid 11 have a hemi-spherical shape obtained by rotating a circle about its center line on the swinging axial line 3, so that the entire shape of the receiver 8 covered with the lid 11 is substantially a sphere. Hence, the opening 6 and the fringing means 9 are circular. A container and a lid shaped in hemi-circular or in similar thereto like this embodiment are easily cleaned. It is preferable that such a whole shape be similar to a sphere in regard to miniaturization and design compared with a containing capacity.

Furthermore, according to the embodiment, in the fringing means 9, a ring mounting portion 19 is provided at the periphery of the lid 11, and a seal ring 20 is fitted into the ring mounting portion 19. The seal ring 20 closely touches the inner wall 7 of the receiver including the opening 6 so as to hermetically seal the inside. Hence, it is difficult that rain water and sand penetrate the receiver as well as the odor of the dog dung leaks outside. The seal ring 20 is made of known rubber or plastics. A small scupper 17 formed in the rear of the receiver 8 is for escaping rain water and sand from the vicinity of the fringing means 9 when the lid is shut. A projection 18 formed on the bottom of the receiver 8 is a rubber leg for not allowing the bottom of the receiver to touch the ground when resting the tool having the dung contained therein on a wall.

Furthermore, according to the embodiment, an elastic notch 24 is provided which is supported by a leaf spring, of which one end is fixed to an upper inner wall of the shaft 2, for protruding toward the inner wall of the rod 16' of the operating rod means 16 by the force of the spring. On the other hand, at the corresponding position of the wall of the rod 16', a notch groove 25 is formed. The elastic notch 24 is to be fitted into the notch groove 25 within the movable range of the operating rod means 16 at positions in that the receiver 8 and the front of the lid 11 are opened in a direction catching the dung. This fitting is to be resistance holding device 26 for coming off the operation lever 21 by applying a force more than a predetermined value to the operation lever 21 during movement operation. Thereby, when the operation lever 21 is moved to the position M where is a catching position of the receiver 8 and the lid 11, a resistance is applied to the movement operation by the fitting. Although this resistance force is sufficient for the holding force during catching operation, if necessary, as shown in FIG. 3, the stop pin 33 may also be fitted into the intermediate stop hole 35 by pushing the stop lever 23 so as to maintain the receiver 8 and the lid 11 immovable. Thereby, the catching operation may be more easily performed.

The elastic notch 24 may be fixedly provided adjacent to the operation unit of the operating rod means 16 and the notch groove 25 may be provided adjacent to the shaft 2. In any of the cases, the same functions can be obtained.

Figure 8:
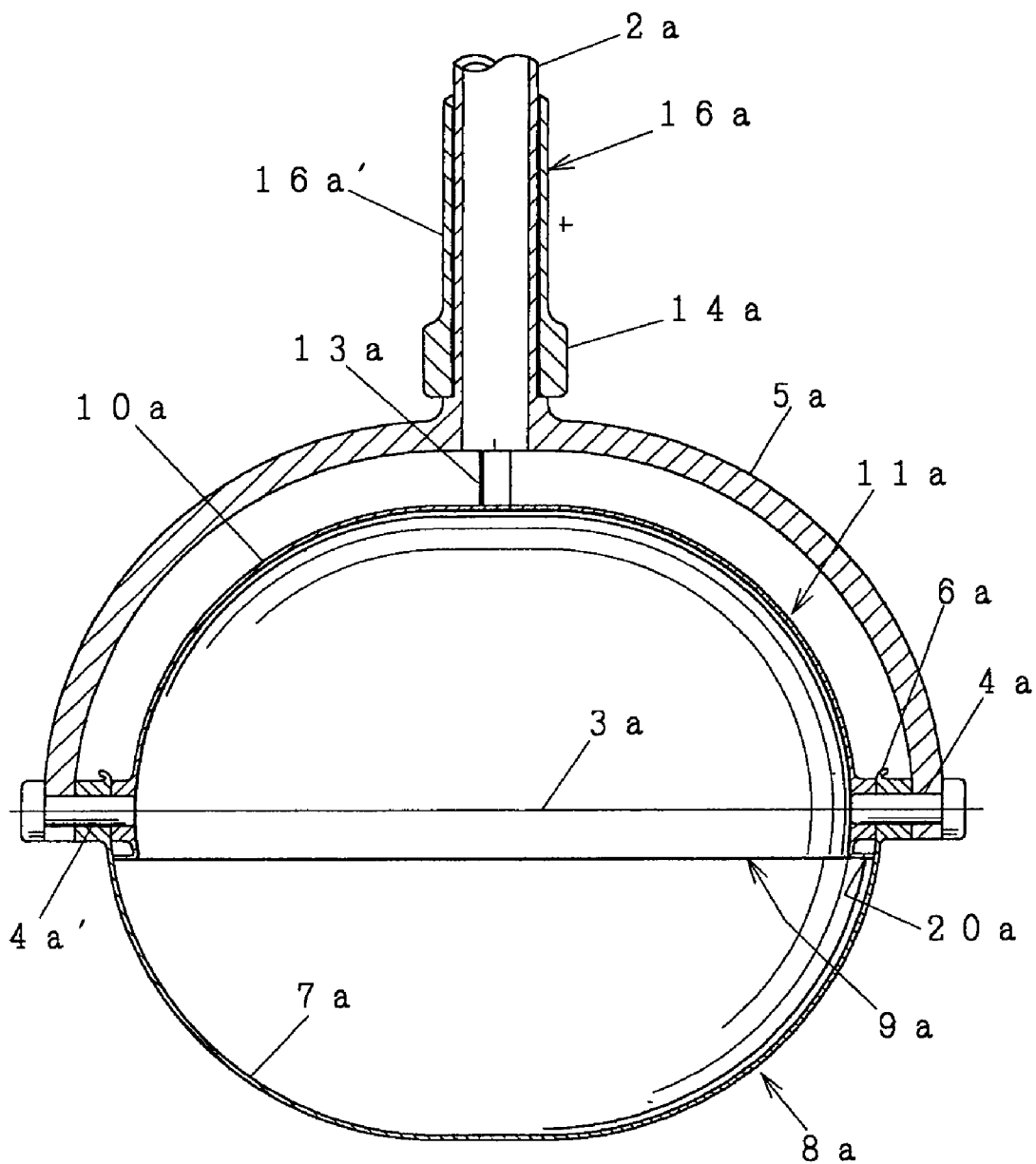
FIG. 8 is a front sectional view of another embodiment.

FIG. 8 shows another embodiment of the present invention. In the description of this embodiment below, like reference characters designate like portions common to the first embodiment by attaching subscripts, such as a, b, c, - - -, therewith, so that the detailed description is omitted and the different portions will be mainly described. The respective receiver 8a and the lid 11a herein have a semi-revolution solid shape obtained by rotating a laying oval about its center line on the swinging axial line 3a and by laterally dividing the laying revolution solid into two. The entire of the receiver covered with the lid, as shown in FIG. 8, has a shape like a rugby ball in a horizontal state. The fringing means 9a has a shape of the outer flange 20a bent outside from the periphery of the lid 11a so as to closely approach the inner wall 7a of the receiver 8a, so that in the same way as in the first embodiment, the fringing means 9a moves along the inner wall 7a during opening and closing operation. A covering portion 10a covering the inner portion of the fringing means 9a has a protruding semi-revolution solid shape rotated about the swinging axial line 3a and located close to the inner wall 7a of the receiver.

Figure 9:
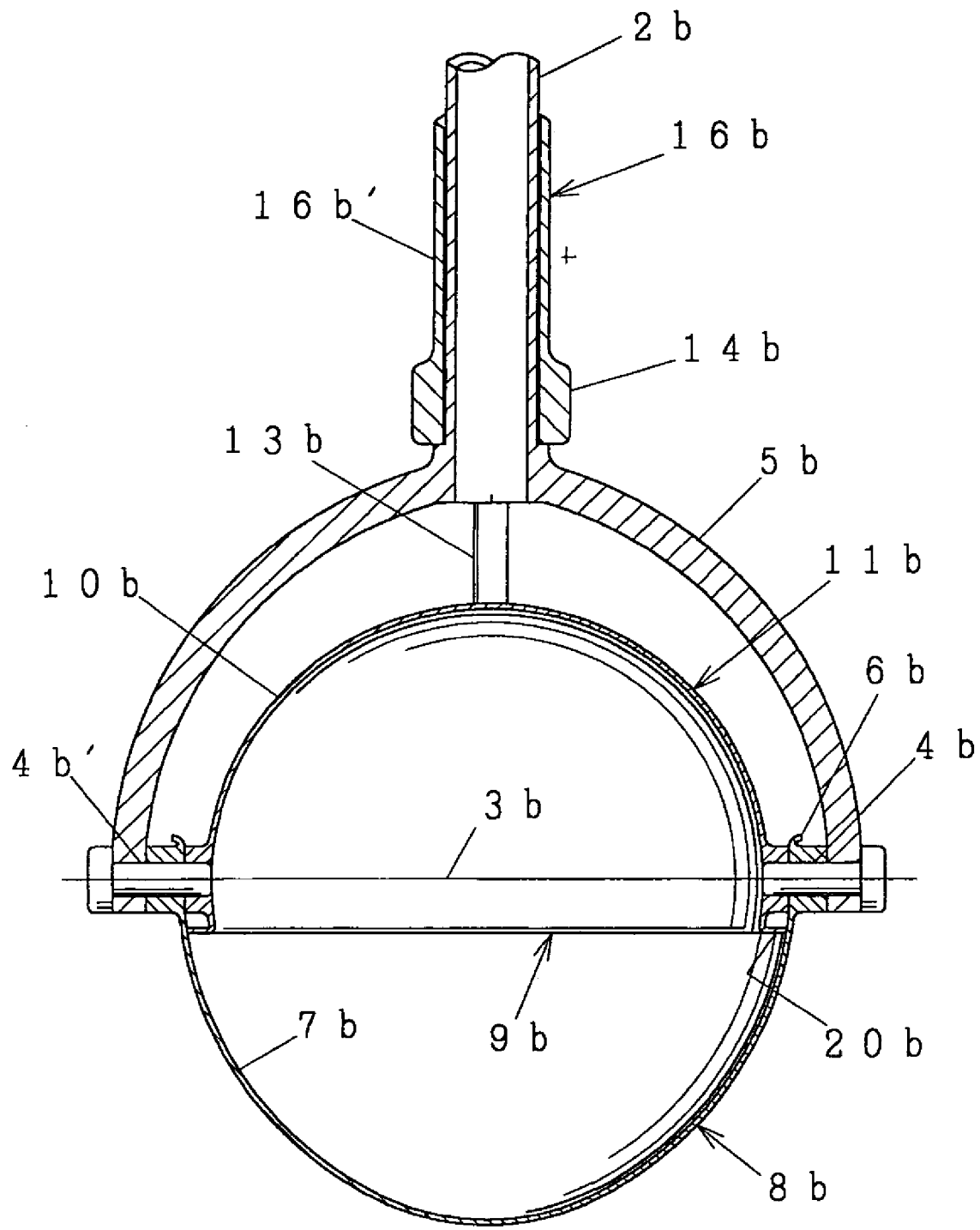
FIG. 9 is a front sectional view of another embodiment.

In FIG. 9, the respective receiver 8b and the lid 11b have a semi-revolution solid shape obtained by rotating a standing oval about its horizontal center line on the swinging axial line 3b and by crosswise dividing the standing revolution solid into two. The entire of the receiver 8b covered with the lid 11b has a shape like a discus of the discus throw in a vertical state. The fringing means 9b of the lid, in the same way as that shown FIG. 8, has a shape of the outer flange 20b bent outside so as to closely approach the inner wall 7b of the receiver 8b.

Figure 10:
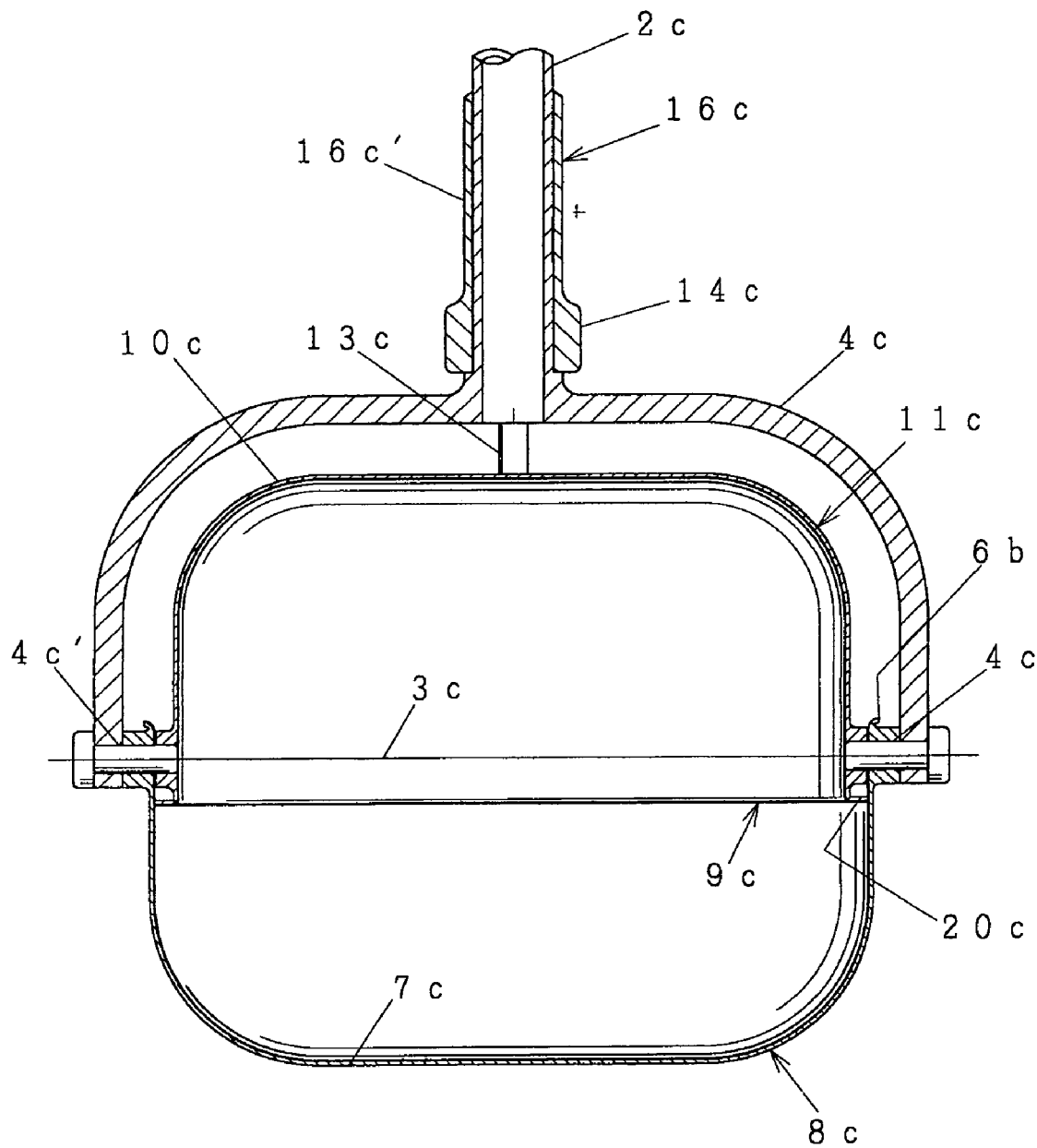
FIG. 10 is a front sectional view of another embodiment.

In FIG. 10, the respective receiver 8c and the lid 11c have a semi-columnar body shape obtained by longitudinally dividing a columnar body having a center line with rounded corners into two. The entire of the receiver covered with the lid in the inside has a shape like a columnar body with rounded corners. The fringing means 9c of the lid, in the same way as that shown FIG. 8, has a shape of the outer flange 20c.

The receiver has a shape of a semi-revolution solid about the swinging axial line, and the lid is set inside the receiver and its fringing means closely approaches the inner wall inside the opening of the receiver, so that the dung is difficult to spill out of the receiver as well as during the discharging, the dung in the receiver is scraped by the rear of the fringing means toward the front for not allowing the dung adhering to the inner wall to remain there, and maintaining the inner wall clean.

Furthermore, the receiver has a shape of a deep semi-revolution solid or a concave semi-sphere, and the lid has a protruding shape, approaching the inner wall of the receiver, of a semi-revolution solid or a semi-sphere about the swinging axial line, and the entire of the receiver covered with the lid has a shape of a revolution solid close to a sphere or a sphere when the operating rod means is held in the closed position, so that there is provided a tool for picking up and carrying dog dung which is compact and easily cleaned in both the inside and outside due to the rounded corners as well as has a large capacity with a large depth.

Figure 11:
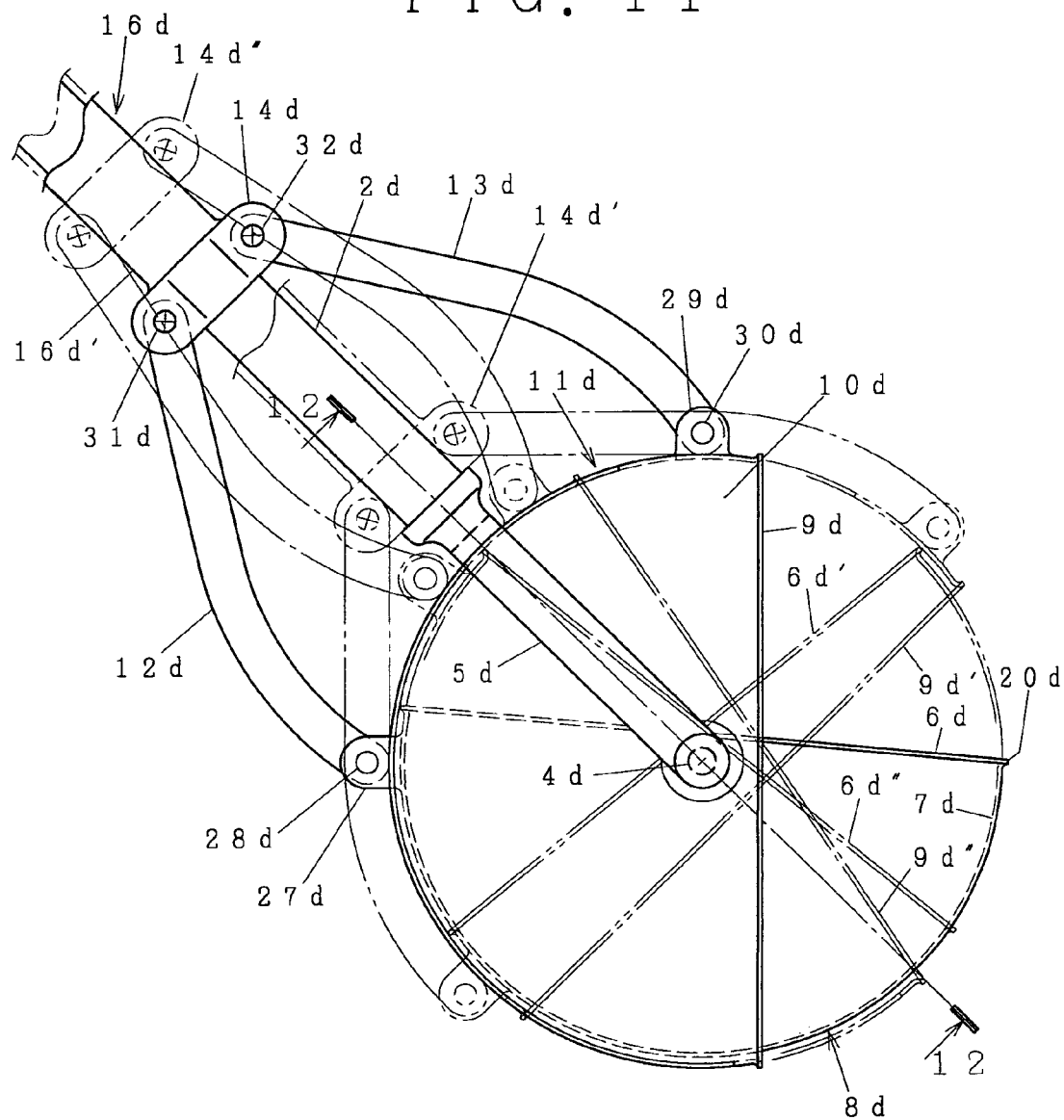
FIG. 11 is an enlarged partial side view of the vicinity of the receiver in another embodiment showing states of elements at the opened position and the closed position of the receiver with phantom lines.
Figure 12:
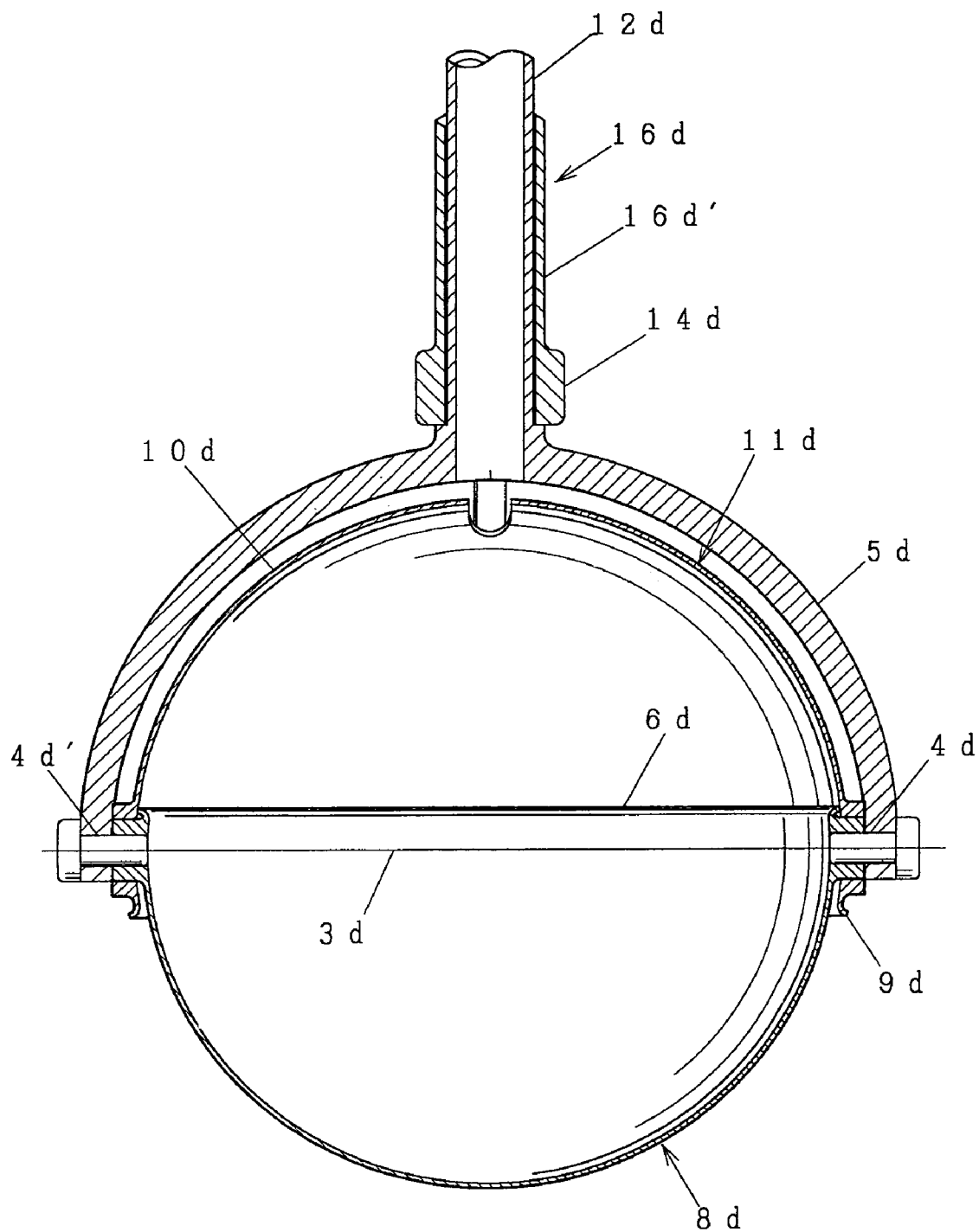
FIG. 12 is a sectional view at the line 12-12 of FIG. 11 showing a state in that the lid is shut.

FIGS. 11 and 12 show still another embodiment of the present invention, in which the lid 11d is supported to the swinging supports 4d and 4d' outside the receiver 8d, and in the same way as in the embodiments described above, by the movement of the operating rod means 16d, the receiver 8d and the lid 11d are swung about the swinging axial line 3d in directions opposing each other so as to be opened and closed. The respective the receiver 8d and the lid 11d have a shape of a semi-sphere obtained by rotating a circle about the swinging axial line 3d on the swinging axial line 3d and by laterally dividing the sphere into two. The entire of the receiver covered with the lid has a shape like a sphere. When the link holder 14d is held at the position 14d', the opening 6d of the receiver is located at the position 6d', so that the fringing means 9d covers the outside at the position 9d'. FIG. 12 shows a state that the lid covers the receiver. The peripheral edge of the opening 6d has the outer flange 20d bent outside so as to approach the inner wall of the cover portion 10d. Then, during moving of the link holder 14d to the position 14d", the rear of the opening 6d of the receiver scrapes things adhering to the inner wall of the cover portion 10d of the lid so as to clean the inner wall.

When the link holder 14d is located at the position 14d' so as to hold the lid at the closed position, the entire of the receiver covered with the lid has a shape like a sphere, so that there is provided a tool for picking up and carrying dog dung which is compact and easily cleaned in both the inside and outside as well as has a large capacity with a large depth.

Figure 13:
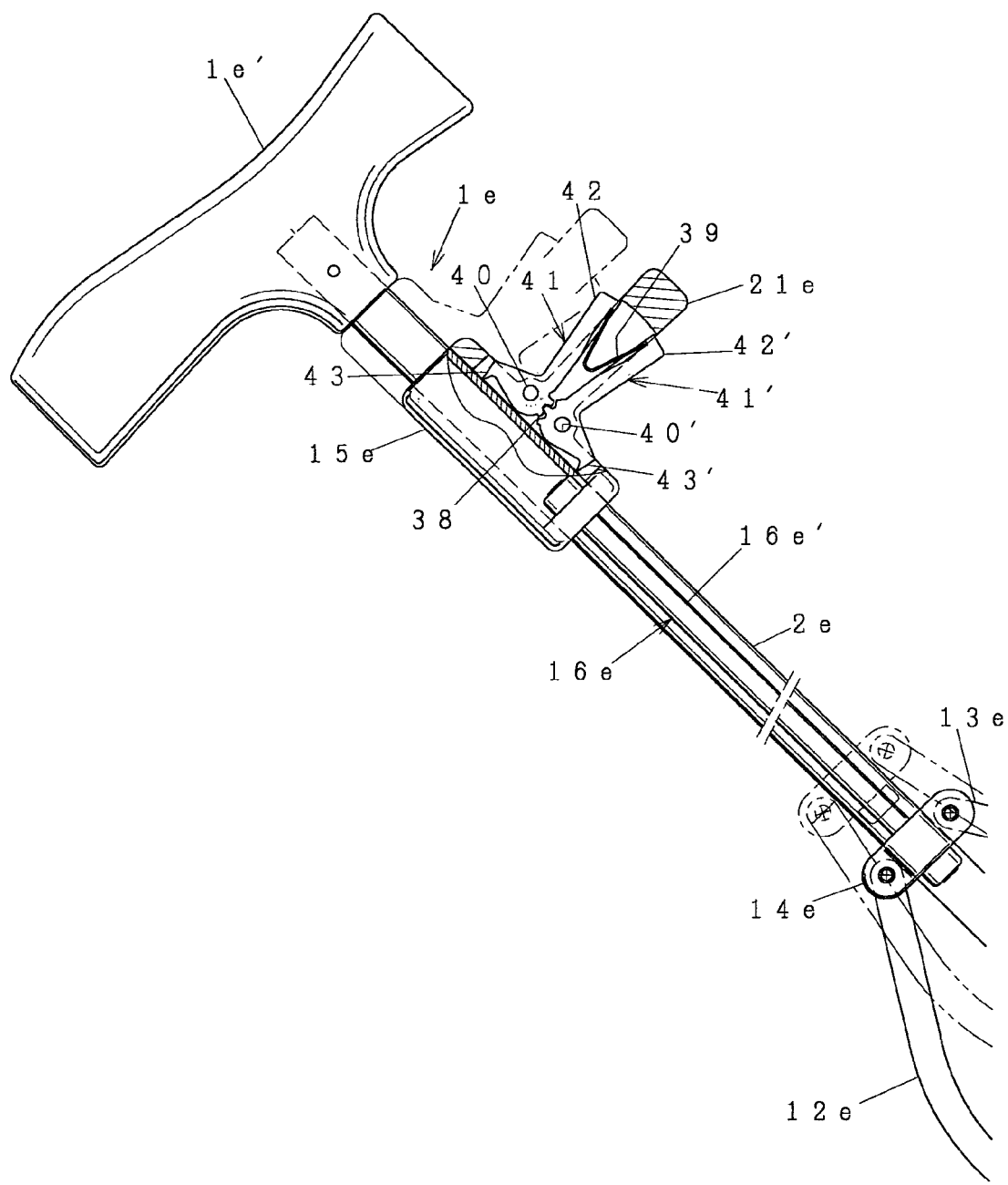
FIG. 13 is a partial side view of the vicinity of the operation unit of another embodiment showing the position of the operation lever at the opened position of the receiver with phantom lines.

FIG. 13 further shows another embodiment of the present invention. The operating rod means 16e includes two rods 16e' connecting the link holder 14e movably fitted to the shaft 2e to the operation unit 15e at their both ends. The rods 16e' are provided on both sides of the shaft 2e. The operation lever 21e is arranged in front of the operation unit 15e so as to protrude in a direction intersecting the shaft 2e. The operation lever 21e is provided with stop levers 41 and 41' exposed from the upper and lower sides of a finger-applying portion of the operation lever 21e for swinging up and down so as to oppose each other like wings of a butterfly. The upper stop lever 41 is retained in the operation lever 21e by swinging holding means of a pin 40, and includes a lever portion 42 swinging about the pin 40 in the vertical direction of the shaft 2e and a stop claw 43 arranged adjacent to a root for swinging in the back and forth directions. The lower stop lever 41' is retained in the operation lever 21e by swinging holding means of a pin 40' symmetrically with the upper stop lever 41. On opposing faces adjacent to roots of the upper stop lever 41 and the lower stop lever 41', there is provided a swinging connection unit 38 like gears meshing with each other. Then, when one of the stop lever 41 and the stop lever 41' swings, the other swings in the opposite direction. Between the lever portions 42 and 42' of both the stop levers 41 and 41', an opening spring 39 is fitted for separating the lever portion 42 from the lever portion 42'. Thus, normally, both the lever portions 42 and 42' are largely exposed from the operation lever 21e and both the stop claws 43 and 43' are pushed on the surface of the shaft 2e by the force of the opening spring 39, maintaining the movement locked. Thereby, the operating rod means 16e is held without vertical movement. When a fingertip is applied on the upper side or lower side of the operation lever 21e for opening or closing the receiver and the lid, the fingertip certainly pushes the lever portion 42 or the lever portion 42' first, both the stop claws 43 and 43' are floated so as to release the locking. After the operation, when the fingertip is separated from the operation lever 21e, the locking is again maintained. When fine lateral notches are formed on portions of the shaft 2e to be pushed with the stop claws 43 and 43', the movement of the operating rod means 16e can be more efficiently stopped.

Figure 16:
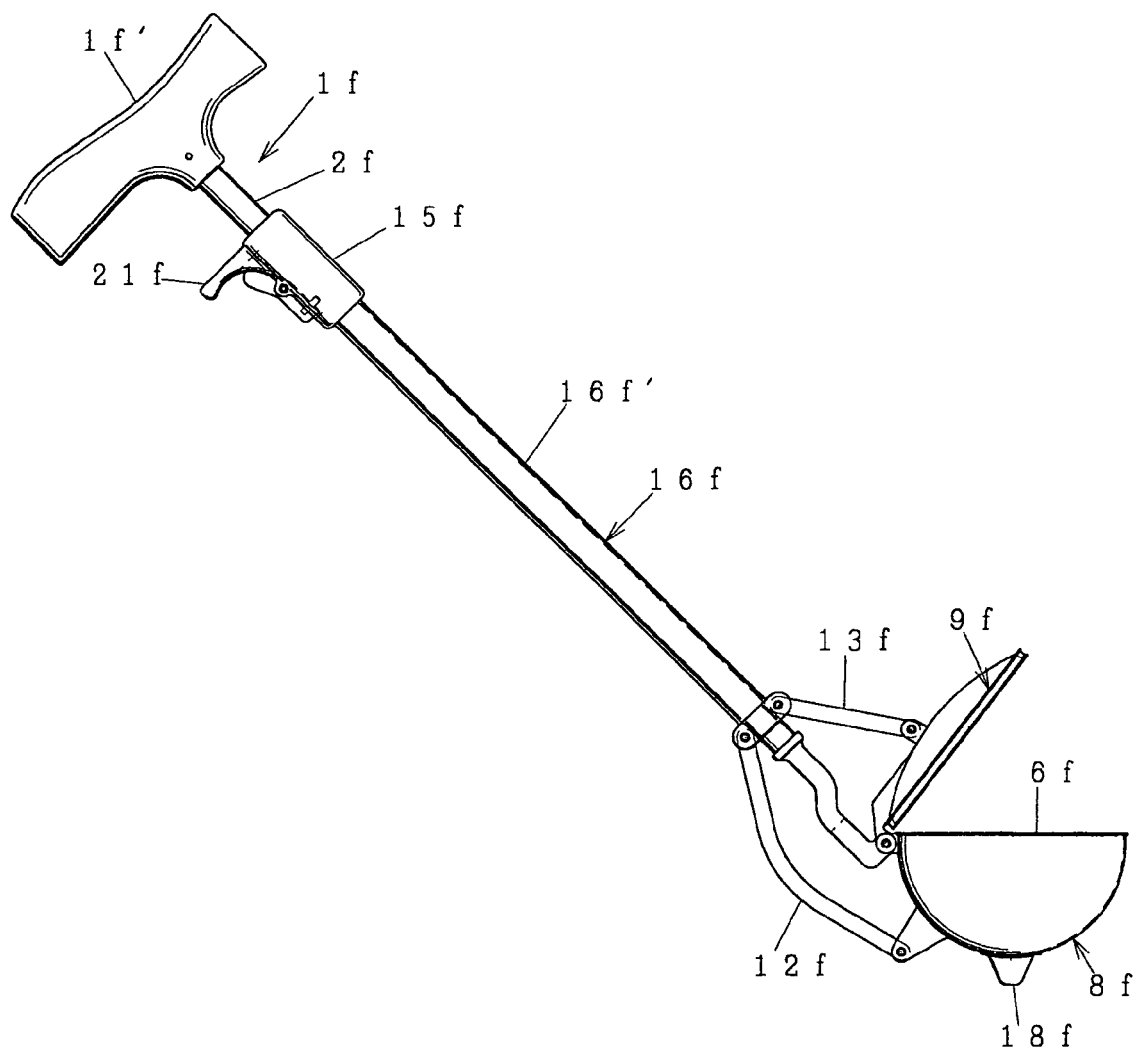
FIG. 16 is a side view of the embodiment shown in FIG. 14 showing the shaft inclined at an angle of 45° rearward and the receiver opened in a direction suitable for catching dung.

FIGS. 14 to 16 further show another embodiment of the present invention, in which there is provided a swinging support composed of one pin and arranged at the front end of the shaft 2f of the shank 1f. The swinging support 4f includes a swinging axial line along a direction intersecting the shaft 2f of the shank 1f at the right angle. In front of the swinging support 4f, there is provided the bowl-like receiver 8f having the flat opening 6f, which opens substantially in parallel with the swinging axial line, and the receiver 8f is supported swingably about the swinging axial line by fitting a boss formed on a rear side in the vicinity of the opening 6f of the receiver 8f to the swinging support 4f. Above the receiver 8f, there is provided the lid 11f having the fringing means 9f arranged substantially in parallel with the swinging axial line for covering the opening 6f by closely approaching the opening 6f, the cover portion 10f arranged inside, and a rear boss formed in the vicinity of the peripheral edge and fitted to the swinging support 4f. In the fringing means 9f, a ring mounting portion is formed in the periphery of the lid, and to the ring mounting portion, the seal ring 20f is fitted so as to hermetically adhere to the inside of the opening 6f. In the lower rear of the receiver 8f, the boss 27f for a connection pin is formed, so that the lower end of the rear link 12f is connected to the boss 27f via the pin 28f rotatably in back and forth directions. On the other hand, the boss 29f for a connection pin is formed substantially at the center of the lid 11f, so that the lower end of the front link 13f is connected to the boss 29f via the pin 30f rotatably in back and forth directions. To the shaft 2f, the operating rod means 16f of the rod 16f made of a pipe is fitted slidably in the vertical direction. In the lower portion of the operating rod means 16f, the link holder 14f is fixed for holding the upper ends of the rear link 12f and the front link 13f via the pin 31f and the pin 32f, respectively, rotatably in back and forth directions. In the upper portion of the operating rod means 16f, the operation unit 15f having the operation lever 21f rearward extending so as to intersect the shaft 2f is fixed. Since the operation unit 15f is the same as that of the first embodiment, its description is omitted.

FIG. 14 shows a state of the shaft 2f directed in a vertical (perpendicular) direction and of the lid shut up, in which the stop lever 23f is hooked through pushing, and the operating rod means 16f is stopped moving so as to maintain the receiver 8f and the lid 11f immovable.

Normally, the tool is carried in this state of the shaft directed in the vertical direction. In this state, the receiver 8f is substantially leveled and the lid 11f is securely shut, so that the dung cannot be spilled out.

Also, in this embodiment, the discharge of the dung can be performed in the vertical state as shown in FIG. 15. By operating the stop lever 23f so as to once come off it, the operation unit 15f is moved to the top position as shown in the drawing. When the operation unit 15f is retained at this position, the opening 6f of the receiver 8f and the lid 11f are largely opened frontward.

FIG. 16 depicts a state that the shaft 2 is rearward inclined at 45° to vertical and the operation lever 21f is positioned at an intermediate movement. In this state, the receiver 8f and the lid 11f are inclined forward, so that the opening 6f is opened approximately horizontally, so that this angle is suitable for catching the dung during defecation. This is very simple tool in structure.

FIGS. 17 and 18 further show another embodiment of the present invention, in which two above and below swinging supports 4g and 4g' are provided at the front end of the shaft 2g of the shank 1g. The swinging supports 4g and 4g' are in parallel with each other and have a swinging axial line along a perpendicular direction to the shaft 2g. In front of the swinging support 4g, there is the cup-like receiver 8g with the flat opening 6g, which opens substantially in parallel with the swinging axial line. The receiver 8g is supported swingably about the swinging axial line by fitting a boss formed at the rear of the receiver 8g in the vicinity of the opening 6g to the swinging support 4g. In front of the swinging support 4g', there is the lid 11g including the fringing means 9g for covering the opening 6g by closely approaching the opening 6g approximately in parallel with the swinging axial line and the cover portion 10g for the inside. At the approximate center of the lid 11g, the boss 29g of the connection pin is formed, and the front end of a swinging link 50 extending back and forth is connected to the boss 29g via the pin 30g. The rear end of the swinging link 50 is fitted to the swinging support 4g', and is supported swingably in a direction opposing the receiver 8g. In the lower rear of the receiver 8g, the boss 27g for the connection pin is formed, and the lower end of the rear link 12g is connected to the boss 27g via the pin 28g rotatably in back and forth directions. On the other hand, the boss 29g of the lid 11g is connected to the lower end of the front link 13g via the pin 30g rotatably in back and forth directions. To the shaft 2g, the operating rod means 16g of the rod made of a pipe is fitted slidably in the vertical direction. At the lower end of the operating rod means 16g, the link holder 14g is fixed for connecting the upper ends of the rear link 12g and the front link 13g via the pin 31g and the pin 32g, respectively, rotatably in back and forth directions. On the other hand, at the upper end of the operating rod means 16g, the operation unit 15g having the operation lever 21g extending back and forth directions intersecting the shaft 2g is fixed. The detail of the operation unit 15g will be described in the following embodiment, so that the description herein is omitted.

FIG. 17 shows a state of the shaft 2g directed in a vertical (perpendicular) direction and of the lid shut up, in which the operating rod means 16g is stopped moving by the operation unit 15g so as to maintain the receiver 8g and the lid 11g immovable. At this time, the lid 11g is slightly swingable in back and forth directions using the pin 30g as a fulcrum, enabling the fringing means 9g to closely abut along the inside of the opening 6g of the receiver.

Normally, the tool is carried in this state of the shaft directed in the vertical direction. In this state, the receiver 8g is substantially leveled and the lid 11g is securely shut, so that the dung cannot be spilled out.

The discharge of the dung may also be performed in a vertical state of the receiver 8g as shown in FIG. 18. When the operation unit 15g, as shown in the drawing, is moved to the top position and held at this position, the opening 6g of the receiver 8g and the lid 11g are largely opened forwardly.

Figure 19:
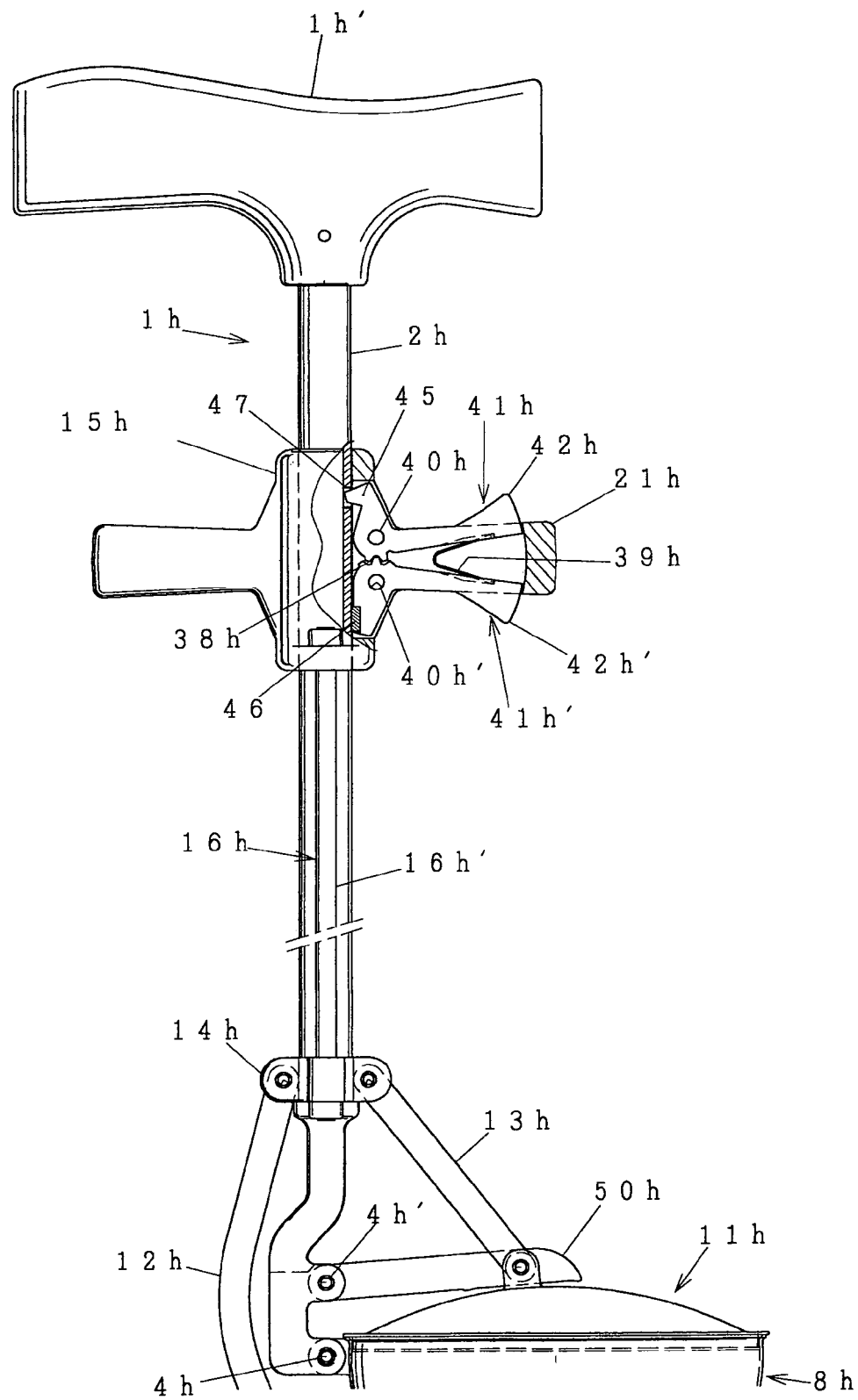
FIG. 19 is a partial side sectional view of an embodiment showing in the vicinity of the operation unit.

FIG. 19 shows another embodiment of the operating unit incorporated to the previous embodiments, in which the operation unit 15h fixed on the operating rod means 16h is provided with the operation lever 21h protruding forward and rearward so as to intersect the shaft 2h. Inside the front operation lever 21h, the upper stop lever 41h and the lower stop lever 41h' are provided up and down, which are swingable so as to oppose each other like wings of a butterfly. On the other hand, the shaft 2h is provided with a stop hole 47 bored on the front side at a predetermined stop position.

The upper stop lever 41h is held to the operation lever 21h by the swinging holding means of the pin 40h, and includes the lever portion 42h swinging about the pin 40h in the vertical direction and a stop projection 45 swinging in back and forth directions in the root side. The lower lever portion 41h' is held to the operation lever 21h by the swinging holding means symmetrically with the upper stop lever 41h. On the root side of the stop lever 41h', a friction shoe 46 is provided for pushing the front side of the shaft 2h. In the opposing portion between the stop lever 41h and the stop lever 41h' on the root side, there is provided the swinging connection unit 38h like gears meshing with each other. Then, when one of the stop lever 41h and the stop lever 41h' swings, the other swings in the opposite direction. Between the lever portions 42h and 42h' of both the stop levers 41h and 41h', the opening spring 39h is fitted for separating the lever portion 42h from the lever portion 42h'. Thus, when the operating rod means 16h moves to a predetermined position, the stop projection 45 of the upper stop lever 41h is fitted into the stop hole 47 so that rear ends of both the lever portions 42h and 42W are largely exposed from the operation lever 21h. Then, the operating rod means 16h is held without vertical movement. The stop projection 45 functions to strongly stop the vertical movement of the operating rod means 16h, that is, the movement to open the lid, and the friction shoe 46 suppresses vibrations of the lid and the links by a frictional force to the surface of the shaft 2h.

By providing the swinging supports in the rear of the receiver and the lid in such a manner, the tool for picking up and carrying dog dung is obtained which is capable of largely opening the lid during catching the dung.

As described above, according to the present invention, a tool for picking up and carrying dog dung is obtained in that a receiver and a lid supported at an end of a long shaft and swinging oppositely to each other can be opened in a direction which easily picking up the dung by a simple operation of an operation unit on hand so as to hold the receiver after the catching in a direction which easily carrying the dung by closing a lid after picking up the dung as well as to largely open the receiver in a direction in which easily discharge the dung while carrying the tool in one's hand.

Furthermore, by attaching the seal ring, which closely touches the inner wall including the opening of the receiver, to the periphery of the lid, the tool for picking up and carrying dog dung that is firm without rattle is obtained, in which the opening of the receiver is securely shut, so that rain-water is difficult to infiltrate the receiver as well as odor of the dog dung cannot leak out.

By using the operation lever moving up and down along the shaft in the vicinity of the grip, the receiver and the lid can be simply held at a desired position with a fingertip while gripping the grip. With the fingertip hung on the operation lever, the stop lever can be released.

By providing the operation unit having a pair of the up and down stop levers, which are up-and-down symmetrically retained inside the operation lever extending in a direction intersecting the shank in the vicinity of the grip and are locked by the force of the opening spring and released by the force of the fingertip during operation, the tool for picking up and carrying dog dung can be obtained that is capable of the opening and closing operation and the locking of the receiver and the lid with a fingertip while carrying the grip.

By providing the T-shaped grip at the upper end of the shaft of the shank, the tool for picking up and carrying dog dung becomes easy to carry it for walk and to operate it because the direction of the receiver conveniently agrees with those of the gripping of a hand and the shaft.

INDUSTRIAL APPLICABILITY

According to the present invention, the tool for picking up and carrying dog dung is excellent in picking up, housing, and discharging the dog dung as well as having good appearance and not giving repulsed feeling when carrying it for dog walk, so that this is applicable to people liking pets and people suffering from dung harm.

The invention claimed is:

1. A tool for picking up and carrying dog dung comprising:
a shank having a shaft longitudinally linearly extending from a grip and at least one swinging support attached to an end of the shaft so as to have a swinging axial line in a direction intersecting with the shaft;
a receiver having an opening, which opens substantially in parallel with the swinging axial line, and a concave inner wall, the receiver being supported swingably about the swinging axial line by fitting at least one support disposed on the opening to the swinging support;
a lid having a periphery disposed substantially in parallel with the swinging axial line for closely covering the opening and a cover for covering the inside of the periphery, the lid being supported swingably in a direction opposing the receiver by fitting at least one support disposed on the peripheral to the swinging support;
a rear link with its lower end rotatably connected to a boss provided at part of an outer wall of the receiver;
a front link with its lower end rotatably connected to a boss provided at part of an outer wall of the lid; and
an operating rod means includes, at lower end, a link holder rotatably connected to upper ends of the rear link and the front link, and retained by the shaft movably in a vertical direction for swinging the receiver and the lid about the swinging axial line in such a manner that the receiver is upturned at about a right angle toward the shaft when the lid is shut.

2. The tool according to claim 1, wherein the shank includes one swinging support attached to the end of the shaft, the receiver being supported swingably by fitting one support disposed on the rear side in the vicinity of the opening to the swinging support; and the lid being supported swingably above the receiver in a direction opposing the receiver by fitting one support disposed on the rear side in the vicinity of the peripheral to the swinging support.

3. The tool according to claim 1, wherein the shank includes a swinging support of the receiver attached to the end of the shaft so as to have a swinging axial line in a direction intersecting with the shaft, and a swinging support of the lid disposed in parallel with the swinging support of the receiver; the receiver being supported swingably by fitting one support disposed on the rear side in the vicinity of the opening to the swinging support of the receiver; and the lid being supported swingably above the receiver in a direction opposing the receiver by fitting one support disposed on a rear end of a swinging link which its front end rotatably connected to the boss disposed on the approximate center of the lid and its rear end extending rearward in the vicinity of the peripheral of the lid, to the swinging support of the lid.

4. A tool for picking up and carrying dog dung comprising:
a shank having a shaft longitudinally linearly extending from a grip and a fork attached to an end of the shaft so as to linearly extend, forked ends of the fork laterally separating from each other, and to have swinging supports respectively attached to the forked ends along a swinging axial line in a direction intersecting with the shaft;
a receiver having an opening, which opens substantially in parallel with the swinging axial line, and an inner wall deeply concave from the opening, the receiver being supported swingably about the swinging axial line by fitting supports disposed on both sides of the opening to the swinging supports inside the fork, respectively;
a lid having a periphery disposed substantially in parallel with the swinging axial line for closely covering the inside of the opening and a cover for covering the inside of the a periphery, the lid being supported swingably in a direction opposing the receiver by fitting supports disposed on both sides of the peripheral to the both swinging supports, respectively, in the inside of the receiver;
a rear link with its lower end rotatably connected to a boss provided at part of an outer wall of the receiver;
a front link with its lower end rotatably connected to a boss provided at part of an outer wall of the lid; and
an operating rod means includes, at a lower end, a link holder rotatably connected to upper ends of the rear link and the front link, and retained by the shaft movably in a vertical direction for swinging the receiver and the lid about the swinging axial line in such a manner that the receiver is upturned at about a right angle toward the shaft when the lid is shut.

5. The tool according to claim 4, wherein the receiver includes an inner wall concave in a shape of a semi-revolution solid rotated about the swinging axial line and an opening, which flatly opens substantially in parallel with the swinging axial line, the receiver being supported swingably about the swinging axial line by fitting supports disposed on the both sides of the opening to both the swinging supports of the fork, respectively.

6. The tool according to claim 5, wherein the lid includes a cover movable along the inner wall of the receiver so as to protrude in a shape of a semi-revolution solid rotated about the swinging axial line, the lid being supported swingably by fitting the supports disposed on both sides of the periphery to the both swinging supports in the inside of the receiver, respectively.

7. The tool according to claim 4, wherein the receiver includes an inner wall concave in a hemispherical shape rotated about the swinging axial line and an opening, which flatly opens substantially in parallel with the swinging axial line, the receiver being supported swingably by fitting supports disposed on the both sides of the opening to both the swinging supports, respectively, inside the fork; and the lid includes periphery for closely covering the inside of the opening and a cover for covering the inside of the periphery by approaching the inner wall of the receiver so as to protrude in a hemispherical shape, the lid being supported swingably about the swinging axial line in a direction opposing the receiver by fitting the supports disposed on both sides of the periphery to the both swinging supports in the inside of the receiver, respectively; so that the entire of the receiver and the lid has a substantially spherical shape when the lid is held in a closed position.

8. A tool for picking up and carrying dog dung comprising:
a shank having a shaft longitudinally linearly extending from a grip and a fork attached to the end of the shaft so as to linearly extend, forked ends of the fork laterally separating from each other, and to have swinging supports respectively attached to the forked ends along a swinging axial line in a direction intersecting with the shaft;
a receiver having an opening, which opens substantially in parallel with the swinging axial line, and an inner wall deeply concave from the opening, the receiver being supported swingably about the swinging axial line by fitting supports disposed on both sides of the opening to the swinging supports inside the fork, respectively;
a lid having a periphery disposed substantially in parallel with the swinging axial line for closely covering the outside of the opening and a cover for covering the inside of the periphery, the lid being supported swingably in a direction opposing the receiver by fitting supports disposed on both sides of the peripheral to the both swinging supports, respectively, in the outside of the receiver;
a rear link with its lower end rotatably connected to a boss provided at part of an outer wall of the receiver;
a front link with its lower end rotatably connected to a boss provided at part of an outer wall of the lid; and
an operating rod means includes, at lower end, a link holder rotatably connected to upper ends of the rear link and the front link, and retained by the shaft movably in a vertical direction for swinging the receiver and the lid about the swinging axial line in such a manner that the receiver is upturned at about a right angle toward the shaft when the lid is shut.

9. The tool according to claim 8, wherein the receiver includes an inner wall concave in a hemispherical shape rotated about the swinging axial line and an opening, which flatly opens substantially in parallel with the swinging axial line, the receiver being supported swingably by fitting supports disposed on the both sides of the opening to both the swinging supports, respectively, inside the fork; and the lid includes a cover protruding in a hemispherical shape, so that an entire combination of the receiver and the lid substantially has a spherical shape when the lid is held in a closed position.

10. The tool according to claim 8, wherein the receiver includes a fringing means on out side of the opening so as to closely approach the inner wall of the cover of the lid.

11. The tool according to claim 10, wherein the lid includes an inner wall of the cover in a shape of a semi-revolution solid rotated about the swinging axial line.

12. The tool according to claim 10, wherein the fringing means includes an outer flange bent outside from the peripheral edge of the opening.

13. The tool according to claim 1, 4 or 8, wherein the operating rod means has a operating unit means disposed on the upper side, the operating unit means including an operation lever protruding in at least one direction intersecting with the shaft and a stop lever bent rearward and supported on the lower side of the operation lever, the stop lever swinging towards and away from the shaft like a seesaw, and the stop lever having a stop pin positioned at the lower end of the stop lever for moving in and out of the shaft, and
a stop hole provided in stopping portions of the shaft to engaged with the stop pin.

14. The tool according to claim 1, 4 or 8, wherein the operating rod means having a operating unit means disposed on the upper side which includes an operation lever protruding in at least one direction intersecting with the shaft; an upper stop lever having a lever portion retained in the operation lever swingably in up and down directions by upper pin and upward exposed at least partly from the operation lever, a stop projection moving in and out of the shaft by swinging in front and rear directions toward the shaft from a root side, and an upper connection gear arranged in the lower side of the upper pin; a lower stop lever having a lever portion retained in the operation lever by lower pin symmetrically with the upper stop lever and downward exposed at least partly from the operation lever and a lower connection gear arranged in the upper side of the lower pin so as to mesh with the upper connection gear, the lower stop lever swinging in direction opposing the upper stop lever; an opening spring arranged between the lever portions of both the upper and lower stop levers; and stop hole provided in stopping portions of the shaft to be stopped by the stop projection.

15. The tool according to claim 1, 4 or 8, wherein the operating rod means having a operating unit means disposed on the upper side which includes an operation lever protruding in at least one direction intersecting with the shaft; an upper stop lever having a lever portion retained in the operation lever swingably in up and down directions by upper pin and upward exposed from the operation lever, a stop claw swinging in back and forth directions towards the shaft from a root side, and an upper connection gear arranged in the lower side of the upper pin; and a lower stop lever having a lever portion retained in the operation lever by lower pin symmetrically with the upper stop lever and downward exposed from the operation lever, a stop claw swinging in back and forth directions towards the shaft from a root side, and a lower connection gear arranged in the upper side of the lower pin so as to mesh with the upper connection gear, the lower stop lever swinging in direction opposing the upper stop lever; and an opening spring arranged between the lever portions of both the upper and lower stop lever.

16. The tool according to claim 1, 4 or 8, wherein the operating rod means includes a rod portion slidably fitted on the shaft, and integrally holding the link holder.

17. The tool according to claim 1, 4 or 8, wherein the operating rod means includes a rod portion which integrally holding the link holder on the lower side and retained to the shaft movably in the vertical direction, and a resistance holding device, with a predetermined movement resistance, composed of elastic notch fixed to one side between the shaft and the rod portion for protruding toward the other side wall by elasticity; and a notch groove provided in a wall corresponding to the other side for fitting the elastic notch therein.

18. The tool according to claim 1, 4 or 8, wherein the operating rod means includes two rods provided on both sides of the shaft and each of the two rods connected to the link holder with the lower end, and the link holder movably fitted on the shaft.

19. The tool according to claim 1 or 4, wherein the lid includes a fringing means on the periphery so as to closely approach the opening of the receiver.

20. The tool according to claim 19, wherein the receiver includes an inner wall in a shape of a semi-revolution solid rotated about the swinging axial line.

21. The tool according to claim 19, wherein the fringing means includes a ring mounting portion provided on the periphery and a seal ring fitted into the ring mounting portion so as to closely touch the opening of the receiver.

22. The tool according to claim 19, wherein the fringing means includes an outer flange bent outside from the peripheral edge of the lid so as to closely approach the opening of the receiver.

* * * * *